(12) United States Patent
Lehmann et al.

(10) Patent No.: US 12,186,993 B2
(45) Date of Patent: Jan. 7, 2025

(54) METHOD FOR PRODUCING AN OBJECT BY GENERATIVE MANUFACTURING, COMPONENT, IN PARTICULAR FOR AN AIRCRAFT OR SPACECRAFT, AND COMPUTER-READABLE MEDIUM

(71) Applicant: Premium Aerotec GmbH, Augsburg (DE)

(72) Inventors: Florian Lehmann, Bockhorn (DE); Thomas Mueller, Oldenburg (DE); Maureen Harms, Oldenburg (DE); Thorsten Schröder, Jaderberg (DE)

(73) Assignee: Premium Aerotec GmbH, Augsburg (DE)

( * ) Notice: Subject to any disclaimer, the term of this patent is extended or adjusted under 35 U.S.C. 154(b) by 0 days.

(21) Appl. No.: 17/992,016

(22) Filed: Nov. 22, 2022

(65) Prior Publication Data

US 2023/0085738 A1      Mar. 23, 2023

Related U.S. Application Data

(60) Division of application No. 16/670,655, filed on Oct. 31, 2019, now Pat. No. 11,504,771, which is a
(Continued)

(30) Foreign Application Priority Data

May 19, 2017    (DE) ..................... 10 2017 208 520.7

(51) Int. Cl.
*B29C 64/40* (2017.01)
*B22F 10/20* (2021.01)
(Continued)

(52) U.S. Cl.
CPC .............. *B29C 64/40* (2017.08); *B22F 10/20* (2021.01); *B22F 10/40* (2021.01); *B22F 10/47* (2021.01);
(Continued)

(58) Field of Classification Search
CPC ........... B29C 64/40; B22F 10/47; B22F 10/40
See application file for complete search history.

(56) References Cited

U.S. PATENT DOCUMENTS 5,595,703 A * 1/1997 Swaelens ............... A61B 17/58
427/512
5,943,235 A * 8/1999 Earl ....................... B29C 64/112
700/98
(Continued)

FOREIGN PATENT DOCUMENTS

CN      106 180 708 A      12/2016
DE       10219983 A1        12/2003
(Continued)

OTHER PUBLICATIONS

Arches, Design Buildings Wiki, 2016, pp. 1-3 (Year: 2016).*
(Continued)

*Primary Examiner* — Michael W Hotchkiss
(74) *Attorney, Agent, or Firm* — KDW Firm PLLC

(57) ABSTRACT

Methods for producing an object by generative manufacturing, a component, and a computer-readable medium. In one method, a sheet-like part is formed with bulges. In another method, a supporting structure is formed with an arch formed by arch segments converging in the buildup direction and meet at an arch tip. In another method, a supporting structure is formed with a strut of a cloverleaf-like cross-sectional shape. In another method, a supporting structure is formed with a sheet-like part connected to the object and formed to project obliquely forward from the object in the
(Continued)

buildup direction. In another method, a supporting structure is formed with a sheet-like part extending substantially along the buildup direction, the sheet-like part formed with apertures. In another method, a supporting structure is formed with a sheet-like part connected to the object and, in a region of transition of the same to the object to be generated, has a perforation and/or a predetermined breaking edge along a contour of the object.

4 Claims, 13 Drawing Sheets

Related U.S. Application Data continuation of application No. PCT/EP2018/062781, filed on May 16, 2018.

(51) Int. Cl.
| | | |
|---|---|---|
| B22F 10/28 | (2021.01) | |
| B22F 10/40 | (2021.01) | |
| B22F 10/47 | (2021.01) | |
| B33Y 10/00 | (2015.01) | |
| B33Y 80/00 | (2015.01) | |

(52) U.S. Cl.
CPC ............... *B33Y 10/00* (2014.12); *B33Y 80/00* (2014.12); *B22F 10/28* (2021.01)

(56) References Cited

U.S. PATENT DOCUMENTS

| | | | | |
|---|---|---|---|---|
| 6,193,923 | B1* | 2/2001 | Leyden | B29C 41/36 264/401 |
| 6,797,351 | B2* | 9/2004 | Kulkarni | B33Y 10/00 428/43 |
| 8,046,097 | B2* | 10/2011 | Hull | B29C 64/40 264/177.17 |
| 8,209,044 | B2* | 6/2012 | Inoue | B29C 64/153 700/98 |
| 8,470,234 | B2* | 6/2013 | Clark | B22F 10/47 264/109 |
| 8,903,533 | B2 | 12/2014 | Eggers et al. | |
| 9,434,109 | B2* | 9/2016 | Ding | B29C 33/306 |
| 9,636,869 | B2* | 5/2017 | Kroll | B22F 10/47 |
| 9,809,002 | B2* | 11/2017 | Hundley | B32B 15/04 |
| 10,052,812 | B2* | 8/2018 | Urbanic | B29C 64/40 |
| 10,066,508 | B2 | 9/2018 | Geiger | |
| 10,124,540 | B2* | 11/2018 | Ooba | B33Y 30/00 |
| 10,384,263 | B2* | 8/2019 | Craeghs | B29C 64/153 |
| 10,556,383 | B2 | 2/2020 | Stevenson et al. | |
| 10,576,689 | B2 | 3/2020 | Wighton et al. | |
| 10,668,682 | B2* | 6/2020 | Li | B33Y 50/00 |
| 2004/0075196 | A1* | 4/2004 | Leyden | B29C 41/36 264/401 |
| 2010/0042241 | A1 | 2/2010 | Inoue | |
| 2010/0228369 | A1* | 9/2010 | Eggers | G06T 17/10 700/98 |
| 2014/0251481 | A1* | 9/2014 | Kroll | B22F 10/385 264/401 |
| 2014/0252674 | A1 | 9/2014 | Hundley et al. | |
| 2014/0303942 | A1* | 10/2014 | Wighton | B29C 33/3842 703/1 |
| 2015/0066178 | A1* | 3/2015 | Stava | B22F 10/47 700/98 |
| 2016/0144574 | A1 | 5/2016 | Eilken et al. | |
| 2016/0200051 | A1* | 7/2016 | Urbanic | B29C 64/393 264/308 |
| 2018/0154441 | A1 | 6/2018 | Miller et al. | |
| 2018/0304541 | A1* | 10/2018 | Barth | B29C 64/135 |
| 2018/0311733 | A1* | 11/2018 | Zafar | B22F 10/60 |
| 2018/0311734 | A1* | 11/2018 | Herzog | B22F 10/28 |
| 2018/0319077 | A1 | 11/2018 | Blanchet et al. | |
| 2020/0094474 | A1 | 3/2020 | Mantell et al. | |
| 2020/0139436 | A1 | 5/2020 | Lehmann et al. | |

FOREIGN PATENT DOCUMENTS

| | | | | |
|---|---|---|---|---|
| DE | 10 2011 108 957 A1 | 1/2013 | | |
| DE | 10 2013 218 760 A1 | 3/2015 | | |
| DE | 10 2015 119 746 A1 | 5/2017 | | |
| EP | 0655317 A1 * | 5/1995 | ............. | B29C 64/40 |
| EP | 2 022 622 A1 | 2/2009 | | |
| EP | 3 026 638 A1 | 6/2016 | | |
| WO | WO 2014/174090 A2 | 10/2014 | | |
| WO | 2016112366 A1 | 7/2016 | | |
| WO | WO 2017/076983 A1 | 5/2017 | | |

OTHER PUBLICATIONS

Wikipedia: Gotik. Apr. 14, 2017. https://de.wikipedia.org/w/index.php?title=Gotik&oldid=164552903 [abgerufen am Dec. 5, 2023] English Translation of Article "Gothic".
German Office Action for Application No. 102017208520 dated Oct. 16, 2023.
European Office Action for Application No. 18725207 dated May 26, 2023.
German Office Action for Application No. 10 2017 208 520.7 dated Feb. 1, 2018.
International Search Report for Application No. PCT/EP2018/062781 dated Aug. 21, 2018.
English Translation of the International Preliminary Report on Patentability and Written Opinion for Application No. PCT/EP2018/062781 dated Nov. 19, 2019.
Restriction Requirement for U.S. Appl. No. 16/670,655 dated Mar. 16, 2021.
Non-Final Office Action for U.S. Appl. No. 16/670,655 dated Jun. 7, 2021.
Chinese Office Action for Application No. 201880012968 dated Jul. 26, 2021.
Final Office Action for U.S. Appl. No. 16/670,655 dated Sep. 24, 2021.
Advisory Action for U.S. Appl. No. 16/670,655 dated Dec. 7, 2021.
Chinese Office Action for Application No. 201880012968 dated Feb. 7, 2022.
Non-Final Office Action for U.S. Appl. No. 16/670,655 dated Feb. 25, 2022.

* cited by examiner

METHOD FOR PRODUCING AN OBJECT BY GENERATIVE MANUFACTURING, COMPONENT, IN PARTICULAR FOR AN AIRCRAFT OR SPACECRAFT, AND COMPUTER-READABLE MEDIUM

CROSS-REFERENCE TO RELATED APPLICATIONS

This application is a divisional application of and claims priority to U.S. application Ser. No. 16/670,655 filed Oct. 31, 2019, which is a continuation of and claims priority to PCT/EP2018/062781 filed May 16, 2018 which claims the benefit of and priority to German Patent Application No. 10 2017 208 520.7 filed May 19, 2017, the entire disclosures of which are herein incorporated by reference.

TECHNICAL FIELD

The disclosure herein relates to methods for producing an object by generative manufacturing. Moreover, the disclosure herein relates to components, in particular for an aircraft or a spacecraft, which can be produced with the aid of such methods. The disclosure herein furthermore relates to a computer-readable medium having computer-readable instructions.

BACKGROUND

Generative manufacturing methods, often also referred to as additive manufacturing methods, are used to produce three-dimensional objects such as semifinished products, prototypes or finished components. Manufacturing methods of this kind have also been disclosed under the terms "3-D printing" or "rapid prototyping". By such methods, it is possible to use one and the same device to produce many different, often geometrically very complex, three-dimensional structures, the production of which by conventional methods, such as processing by the removal of material or casting methods, is associated with a high outlay or can be achieved only with difficulty.

In the case of an illustrative generative manufacturing method or 3-D printing method, the object, e.g. a semifinished product which is subsequently to be subjected to further processing steps, is built up layer by layer from the bottom up along a printing direction or buildup direction. By way of example, this can take place in a powder bed process, wherein the starting material is applied in the form of a powder and is irradiated in layers, e.g. by a laser, in order to achieve sintering or melting of the powder at the irradiated locations.

In a layer-by-layer manufacturing method of this kind, there are questions around the attachment of the object to be generated to the base or supporting platform on which printing is carried out and, precisely in the case of complex components, there is the question of any support that may be required for individual sections of the object. The object to be generated should remain in its position during the production process, should not lift off from the base and should thus be fixed in a defined way in space. Generating contours on the object which are precisely defined geometrically, especially in regions of the object that overhang in relation to the direction of action of gravity, makes it necessary to limit the angle at which the overhanging sections of the object overhang relative to the direction of action of gravity—i.e. the overhanging section must not extend at too shallow an angle—and/or to provide an additional supporting structure to support the overhanging sections.

Additional requirements can result from subsequent processing steps if the printed object is a semifinished product which is subjected to further processing steps, e.g. a heat treatment and/or machining. In this context, it is undesirable for any projecting sections of the object to undergo deformation under the effect of heat and under the action of their own weight, for example, and/or for such projecting sections to begin to vibrate during machining, thereby impairing the quality of the machined surface.

EP 3 026 638 A1 and US 2016/0144574 A1, for example, describe a method for adapting a 3-D printing model in which a stratified representation of the object is adapted in such a way that the local overhang angle in overhanging regions remains below a predetermined threshold. This is intended to create structures which are self-supporting during the printing process.

If the intended object geometry is not supposed to be changed, the overhanging sections which are "too shallow" can be supported by a supporting structure that is supposed to be removed later. This can be provided, for example, by a relatively delicate and fragile supporting structure prepared with software called "magics" supplied by a company called Materialise, Leuven, Belgium.

As regards attachment and support aspects in the area of generative manufacture, it has been found that it may be desirable to take account especially of the following aspects:
  there should be as little as possible deformation of the object to be generated, which should, however, also not be subject to internal cracking or tear away from the base;
  it should be possible to remove supporting structures which are not supposed to remain in the finished object easily and with little effort;
  support for sections of the object to be generated should be effective, i.e. geometric distortions, deformations and quality impairments should be reliably avoided;
  as little additional material as possible should be consumed and the printing time should be increased as little as possible in order to save the associated costs, and it should be possible to implement attachment and/or support as practically as possible;
  any heat which is introduced in the printing process should preferably be dissipated in an effective manner.

Depending on the generative manufacturing method and depending on the geometry of the object to be produced, one, some or all of the abovementioned requirements may apply.

Given this background situation, it is the underlying object of the disclosure herein to propose improved solutions for the attachment and/or support of objects which are to be produced in a generative manufacturing method. Here, the intention is to achieve improvements over previously known attachment and support solutions in respect of one, some or more of the abovementioned requirements as regards attachment and/or support.

SUMMARY

According to the disclosure herein, this object is achieved by a method for producing an object and/or by a component and/or by a computer-readable medium having features disclosed herein.

According to the disclosure herein, a first method for producing an object by generative manufacturing by building up the object in layers is proposed, wherein a supporting structure is built up in layers in order to attach the object to be generated to a base by the supporting structure. During this process, the supporting structure is formed with a sheet-like part projecting from the base. In the case of the first method according to the disclosure herein, the sheet-like part is formed with a multiplicity of bulges.

By providing a multiplicity of bulges, the sheet-like part of the supporting structure is provided with a certain degree of elasticity and/or plastic deformability, allowing a considerable improvement in the attachment of an object to be generated to the base. Generatively manufactured objects can be subject to stresses, which may be caused by the welding process in the case of 3-D printing with metal materials, for instance. With the aid of the proposed bulge structure, it is advantageously possible to prevent such internal stresses leading to unwanted deformation of the object or to the occurrence of cracks. For this purpose, an intentional deformation of the supporting structure is permitted to a certain extent with the aid of the proposed bulges. The supporting structure proposed according to the first aspect of the disclosure herein is thus not completely rigid but has a compliance, which can furthermore be controlled by appropriate configuration of the bulges. In particular, the supporting structure can be deformed in part elastically but also in part plastically. Particularly the plastic compliance of the supporting structure provided with the bulges, which is less stiff than the object, advantageously contributes to avoiding plastic deformation of the object. Further advantages of the first method include that not only is tearing off or cracking in the supporting structure avoided, but also that process reliability is thereby increased. Moreover, the first method according to the disclosure herein can be implemented in a relatively simple manner on already existing systems for generative manufacture.

According to the disclosure herein, a second method for producing an object by generative manufacturing by building up the object in layers is furthermore proposed, in which, in addition, a supporting structure is built up in layers in order to support at least one overhanging object section to be generated by the supporting structure. In this case, the supporting structure is formed with at least one arch. The arch is formed by arch segments, wherein the arch segments converge substantially in the buildup direction of the object and meet at a tip of the arch.

A supporting structure with an arch of this kind makes it possible in a simple and reliable manner to bridge relatively large distances in the buildup direction of the object. This is particularly advantageous in cases in which the overhanging object section to be generated and supported is at a relatively large distance from the base on which the object is generatively manufactured, i.e. at a relatively great height above the base. Moreover, the at least one arch contributes to a material-saving buildup of the supporting structure. Forming the arch with the tip, at which the arch segments meet is a simple means of avoiding having to support the arch itself again close to the tip. Forming the arch with a tip enables the arch to be self-supporting during the generative manufacturing process, i.e. allows overhanging sections of the arch not to exceed a critical angle. Furthermore, the arch can be geometrically adapted in a relatively simple manner, e.g. for the purpose of saving space.

In this context, it may be mentioned that the geometry of the arch in the region of the tip at which the arch segments meet is not necessarily formed with a sharp edge and/or a sharp notch but can be provided with a rounded portion to limit the mechanical stresses which arise there. Such a rounded portion may be preferred in various embodiments of the disclosure herein. An arch tip provided with small radii for stress limitation should be regarded as included in the term "tip" in this context.

Moreover, according to the disclosure herein, a third method for producing an object by generative manufacturing by building up the object in layers is proposed, wherein, in addition, a supporting structure is built up in layers in order to support at least one object section to be generated by the supporting structure and/or to stabilize at least one object section to be generated. In this case, the supporting structure is formed with at least one strut of a cloverleaf-like cross-sectional shape, wherein, in particular, the cross-sectional shape can be a cross-sectional shape resembling a four-leaf clover. In particular, the at least one section can be overhanging, wherein the third method can also advantageously be applied to sections which do not overhang.

By struts of this kind, the object can be attached to a base and an object section to be generated or a plurality of object sections to be generated can be provided with solid point support. On the one hand, the point support saves material for the provision of the supporting structure, especially if surface support is not required. On the other hand, the proposed strut can contribute to achieving the desired geometry of the object to be produced as effectively as possible. With generative buildup, the object is supported, fixed in the correct position and prevented from lifting off, and furthermore more stability can be imparted to the object in certain areas. The proposed strut is furthermore also effective over large distances, e.g. in the buildup direction of the object, in particular over great heights. Point support can be helpful even in the generative production of the object in order to avoid defective objects or the discontinuation of a manufacturing cycle (print job). With the aid of the strut, it is furthermore possible, in the case of projecting or floating sections of the object, to enhance the stability thereof by the strut. With the third method according to the disclosure herein, it is advantageously possible to generate an object which suffers no impermissible distortion under the action of the intrinsic weight of such projecting sections, e.g. in a subsequent heat treatment step, which can be a hot isostatic pressing operation, for example. If, furthermore, the building up of the object in layers or the heat treatment is followed by machining and the strut is not removed before machining, the at least one strut can advantageously stabilize projecting or jutting sections of the object during machining. By virtue of the greater stability thereby made possible, it is possible to avoid the situation where vibration is imparted to the projecting or jutting sections during the machining process. It is thus possible to minimize vibrations during cutting. Optical defects and/or reduced quality of the machined surface, due to "chatter marks" for instance, are avoided.

Moreover, by virtue of the cloverleaf-like cross-sectional shape of the strut, it offers the advantage that, during the generative manufacture of the supporting structure together with the object by building them up in layers, excessive stress on the device used for generative manufacture can be avoided. In particular, it is possible to prevent a coating blade in a powder bed process from being subjected to unwanted excessive stress. A coating blade of this kind can follow the cloverleaf-like cross-sectional shape of the strut relatively easily and gently. Moreover, the cloverleaf-like cross-sectional shape contributes to optimized stability, in particular improved torsional stiffness, of the strut.

According to the disclosure herein, a fourth method for producing an object by generative manufacturing by building up the object in layers is furthermore proposed. During this process, at least temporarily during the building up of the object, a supporting structure is additionally built up in layers in order to support at least one overhanging section, to be generated, of the object by the supporting structure. In the case of the fourth method, the supporting structure is formed with a sheet-like part, wherein the sheet-like part is connected to the object and is formed so as to project obliquely forward from the object in the buildup direction of the object.

Since the sheet-like part of the supporting structure projects forward from the object in the buildup direction of the object, it can be positioned relatively close to the overhanging section of the object and does not have to extend from the base to an overhanging object section to be generated at a greater height above the base. The formation of the sheet-like part obliquely forward in the buildup direction of the object allows the sheet-like part to be self-supporting as it is built up in layers, i.e. the sheet-like part can be designed in such a way that it does not extend at an excessively shallow angle, i.e. does not overhang too much, in relation to the direction of action of gravity. With the aid of the sheet-like part, the supporting structure is provided with a supporting surface on which a supporting substructure or supporting geometry of a different character can be built up at a relatively short distance from the overhanging object section to be generated. It is thus easier to apply supporting geometries to support object contours.

Moreover, according to the disclosure herein, a fifth method for producing an object by generative manufacturing by building up the object in layers is provided. In this method, a supporting structure is built up in layers in order to provide linear support by the supporting structure to at least one overhanging section of the object to be generated. In this case, the supporting structure is formed with a sheet-like part extending substantially along the buildup direction of the object, wherein the sheet-like part is formed with a multiplicity of apertures.

In this way, effective support for the at least one section of the object to be generated can be achieved along a line with the aid of the sheet-like part, thus enabling geometrically defined contours to form during printing. Furthermore, material for the supporting structure is saved by the apertures.

According to the disclosure herein, a sixth method for producing an object by generative manufacturing by building up the object in layers is furthermore provided, wherein a supporting structure is built up in layers in order to support at least one section of the object to be generated by the supporting structure. In this case, the supporting structure is formed with a sheet-like part, wherein the sheet-like part is connected to the object and, in the region of a transition of the same to the object to be generated, in which the sheet-like part is attached to the object, is provided with a perforation and/or a predetermined breaking edge along a contour of the object. In particular, the section to be supported can be an overhanging section.

With the aid of the formation of the sheet-like part of the supporting structure with a perforation and/or a predetermined breaking edge, the sheet-like part can be removed manually in a simple manner after the generative production of the object, thereby reducing the outlay for subsequent cutting processes to remove the supporting structure. Moreover, there remains only a small residue of the sheet-like part on the object, and therefore only small remnants of the sheet-like part remaining on the object 10 after the separation of the sheet-like part have to be removed, thereby reducing the effort for cleaning. Removing the residue can be performed manually, for example.

As an alternative or in addition, perforation can contribute to saving materials and to a reliable manufacturing process. Particularly in the case of powder bed methods, perforation can advantageously contribute to ensuring that the powder used as a starting material does not or is less prone to accumulate at the transition between the sheet-like part of the supporting structure and the object since the perforation allows the powder to trickle through. Powder losses can thus be reduced.

According to the disclosure herein, a component, in particular for an aircraft or spacecraft, is furthermore proposed, wherein the component can be produced with the aid of one of the methods according to the disclosure herein.

Moreover, according to the disclosure herein, a computer-readable medium is proposed, wherein the computer-readable medium has computer-readable instructions. When carried out on a data processing device, the computer-readable instructions cause a device or arrangement for generative manufacture comprising the data processing device or communicating therewith to carry out at least one of the methods according to the disclosure herein.

The disclosure herein is of assistance particularly in minimizing costs due to discontinued print jobs and defective or inaccurate objects.

In one embodiment of the first method, to form the bulges, the sheet-like part is formed in two directions extending transversely to one another, in each case with a corrugated shape. In this way, compliance can be provided by elastic and/or plastic deformability of the sheet-like part around more than one axis and/or in more than one direction, which further enhances the effectiveness of the supporting structure for attachment of the object to be generated with a defined and controllable compliance. It is thus possible to increase the reliability of the processes even further.

In one embodiment, it is possible, in particular, for the sheet-like part to bulge out on both sides of the main surface of extent of the sheet-like part to form the bulges. It is thereby advantageously possible to provide compliance in the main surface of extent of the sheet-like part in an expedient way.

The compliance which is provided with the aid of the bulges can consist or comprise, in particular, in a mobility and/or ability to twist of the object in relation to the base effected by elastic and/or plastic compliance.

In one embodiment of the first method, the sheet-like part is formed in such a way that the main surface of extent of the sheet-like part in relation to which the bulges are defined is substantially planar. In this way, compliance can be provided in this plane.

In preferred embodiments of the first method, it is possible, in particular, for the supporting structure to be formed in such a way that the sheet-like part is built up in a substantially upright manner on the base. In this case, it is possible, in particular, for the sheet-like part to be built up vertically on top of the base, substantially at a right angle to the latter. However, other angles are likewise conceivable.

According to another development of the first method, the tips of the bulges or of some of the bulges are omitted as the supporting structure is built up in layers; in other words, the sheet-like part is formed with bulges the tips of which are capped in this embodiment. At the location where the tips of the bulges are omitted, the sheet-like part can be of thinner design or can in each case have a passage. The compliance of the supporting structure can be additionally influenced in this way.

In one embodiment of the second method, it is envisioned that an arch structure having the at least one arch is formed in a first region of the supporting structure, and that a supporting substructure of a different character from the at least one arch is formed in a second region of the supporting structure. In particular, the supporting substructure can be relatively delicate and/or fragile in comparison with the arch. In this embodiment, the arch structure and the supporting substructure are formed in such a way that the arch structure supports the supporting substructure. In this case, the overhanging section of the object is supported over an extended area against the arch structure by the supporting substructure during the buildup of the overhanging section. This makes it possible also to support the overhanging section over a larger area, wherein the supporting substructure is easy to remove, particularly owing to a delicate and fragile design. For this purpose, the supporting substructure can be formed with a finely divided lattice structure in comparison with the arches. With the aid of the arch structure, relatively large distances that have to be bridged, e.g. between a base and the overhanging section, in order to support the overhanging section can successfully be bridged without having to provide the supporting substructure over this entire distance. Precisely if the supporting substructure is delicate and fragile, it is advantageous if this supporting substructure is provided over only a limited length. The length of the supporting substructure is preferably limited in the vertical direction to a maximum of about 50 mm. Thus, the arches make it possible to shorten the supporting substructure, enabling it to operate effectively to support the overhanging section in a precise manner and to ensure the accuracy of the object geometry. The range of use of a supporting substructure of this kind is thus advantageously extended. Moreover, material and printing time is required only for a shorter supporting substructure. For the eventuality that component sections have to be supported over an extended area and over a great height, this embodiment with the arch structure thus offers the possibility of shortening a large-area support provided by the supporting substructure and imparting greater stability to it in this way. Defective objects or discontinuation of the generative manufacturing process ("print jobs") due to inadequate support can be avoided. With an arch structure in which the arch is configured with a tip, it is possible to avoid a situation where the arch itself again requires support. Moreover, the configuration with a tip furthermore offers a sufficient area of support for the supporting substructure of a different character in the upper region of the arch. Thus, provision is made to enable the supporting substructure to still be effectively shortened, even at a certain distance from the tip.

In an advantageous embodiment of the second method, the supporting structure is formed with a plurality of arches, wherein the arches are formed in such a way as to be arranged one above the other in at least two tiers. In this case, the arches of adjacent tiers are formed in such a way as to be connected to one another. In this way, it is possible to bridge even greater distances, in particular greater heights, with the aid of the arch structure. In this case, the arrangement of the arches in two or more tiers makes it possible, in the upper regions of each of the arches, to continue working with self-assembling, i.e. self-supporting, arch segments. It is possible to avoid a situation where the angle between the direction of action of gravity and the arch segment becomes so great locally that the arch itself would have to be supported. Using a plurality of arches which are constructed in such a way as to be stacked one on top of the other in two or more tiers thus enables the arch structure to bridge a relatively large distance and to effectively shorten a fragile supporting substructure without susceptibility to faults in generative production.

In particular, the arch structure can be implemented with two tiers, but also with more than two tiers. Even with two tiers, a large distance can be bridged in a relatively simple manner. Three tiers or four tiers would likewise be conceivable, for example.

In one embodiment of the second method, the arch or arches of the lowest tier of the arch structure, in particular, is/are built up in layers, starting from a base.

According to another development of the second method, the arch or arches can each be built up with two mutually symmetrical arch segments. In an alternative embodiment, the arch or arches can instead be of asymmetrical configuration. A symmetrical design of the arch or arches can be implemented in a particularly simple and rapid way, whereas, with an asymmetric design, it is possible if necessary to take account of a limited amount of space available for the arches.

In other embodiments of the second method, the arch or arches can be designed in such a way that each of the arch segments is formed as a segment of a circular arc or that, alternatively, the arch segments are each composed of two or more circular arc segments. In this way, it is possible, in turn, to vary the arch geometry to save space and to provide a sufficient standing surface for the supporting substructure of a different character. It can be advantageous to form each of the arch segments with one to two circular arc segments, thereby, on the one hand, creating possibilities of geometric adaptation and, on the other hand, keeping the arch structure as simple as possible. In this way, a quick and effective solution to bridging relatively large distances can be provided.

In embodiments of the second method, the arch or arches is/are preferably of rounded design in the regions in which the tip(s) is/are formed and/or in regions in which arch segments stand on the base or on another arch. It is thereby possible to reduce stresses in the vicinity of sharp edges and notches in these regions.

In a development of the second method, the arch structure is formed in such a way that arch segments are built up in layers by arches of one of the tiers, starting from the tips of the arches of the tier situated thereunder. As an alternative, provision can be made for arch segments of the arches of a tier to be built up starting from outsides of arch segments of arches of the arch structure tier situated thereunder.

In a development of the third method, the strut is formed in such a way that it extends between a base and the section of the object or, alternatively, the strut is formed in such a way that it extends between the section of the object and another section of the object. If the strut extends from a base to the section of the object, the section to be generated can in this way be provided with point support during the generative manufacturing process, and the strut can be used to attach the object to the base. Moreover, effective heat dissipation during the manufacturing process can be effected by the strut. According to this alternative, the struts having the cloverleaf-like cross-sectional shape can thus be built up generatively in layers, starting from the base or supporting platform, and thus "grow" along with the object, i.e. can be printed onto the base at the same time. The support provided by the struts can assist the generation of geometrically defined contours of the object. If, in contrast, the strut is built up between two sections of the object, it is likewise possible, on the one hand, for support of at least one of these sections during the generative manufacturing process to be made possible and, on the other hand, it is furthermore also advantageously possible for a strut of this kind to remain within the object during a subsequent machining operation and stabilize the sections of the object relative to one another. In this way, vibrations of the object during machining can be reduced, thereby improving the surface quality obtained. For example, it is possible to avoid "chatter marks" during milling and to further improve the quality of the finished object or component.

In embodiments of the third method, the struts can be elongate and can be of straight or curved design along the direction of extent of the strut.

In another embodiment of the third method, the supporting structure has a plurality of struts, which are built up in layers.

In another embodiment of the third method, the cross-sectional shape of the strut is formed with a plurality of, preferably four, leaf-like subregions, which extend outward from a center of the cross-sectional shape. In this case, the subregions each end, at the end thereof remote from the center, with a circular arc shape, in particular a semicircular shape, having a first radius, wherein subregions each adjacent to one another in the circumferential direction are connected to one another via a circular arc shape, in particular a quadrant shape, having a second radius. In this way, a cloverleaf-like shape is provided for the cross section of the strut, this being gentle in particular on a coating blade, made from rubber for instance, since the coating blade can move relatively gently over the rounded portions provided by such a geometry. Moreover, a cross-sectional shape of this kind provides a strut with an advantageous stability and torsional stiffness.

In one embodiment, mutually adjoining pieces of a peripheral outer contour of the cross-sectional shape are all formed in such a way as to merge tangentially into one another. With this embodiment, edges at the periphery of the strut cross section are avoided, likewise contributing to reducing stresses on the coating blade, for instance.

According to yet another embodiment of the third method, the second radius is approximately two thirds of the first radius. In this case, in particular, centers of circles, starting from which the semicircular shapes are each defined by the first radius, are spaced apart across the center of the cross-sectional shape by a distance which is approximately four times the first radius.

In further embodiments of the third method, the strut(s) is/are removed before machining of the generatively produced object or at the end of or after machining. If the struts are to be used to absorb vibrations during the cutting process, the strut(s) is/are separated from the object only after cutting or at the end of the cutting process.

In one embodiment of the fourth method, the supporting structure is furthermore formed with a supporting substructure of a different character from the sheet-like part, in particular a relatively delicate and/or fragile supporting substructure. In this case, the sheet-like part and the supporting substructure are formed in such a way that the supporting substructure is supported by the sheet-like part and the overhanging section of the object is supported over an extended area against the sheet-like part by the supporting substructure. In this embodiment too, the distance over which the supporting substructure of a different character, in particular delicate, finely divided and/or fragile, is built up in layers can once again be advantageously reduced. Thus, the supporting substructure does not have to be built up over the entire height of the object from the base to the overhanging object section which is to be supported. This saves production time and, furthermore, enables high accuracy of the generated geometry of the generatively manufactured object, especially in cases in which the supporting substructure is of finely divided and fragile design. With only a limited distance over which the supporting substructure is provided, the cracking or distortion thereof can be avoided. Moreover, material which would otherwise be required for the supporting substructure can be saved. Costs associated with high consumption of material and/or printing time can thus be avoided. In this embodiment, the length of the supporting substructure in the vertical direction can be limited, in particular, to a maximum of about 50 mm.

In another embodiment of the fourth and/or sixth method, the sheet-like part is built up in such a way that the main surface of extent thereof projects from the object at an angle of between about 40° and about 60° in relation to a base or, alternatively, at an angle of about 30° to about 50° in relation to a direction of action of gravity. In this way, it is possible to avoid a situation where the sheet-like part itself has to be supported during the generative manufacturing process, i.e. during the buildup in layers.

In another embodiment of the fourth, fifth and/or sixth method, the geometry of the sheet-like part is preferably matched to a contour of the object in a region in which the sheet-like part is connected to the object. In this case, it is possible, in particular, for the contour of the object to be rounded.

In another embodiment of the fourth and/or sixth method, the sheet-like part can be built up in such a way that it projects in the manner of a tongue or tab from the object after its manufacture.

According to a development of the fourth and/or fifth method, the sheet-like part is formed with a predetermined breaking edge along a contour of the object in the region of a transition of the part to the object to be generated, in which the sheet-like part is attached to the object. In this way, the removal of the sheet-like part of the supporting structure after it has fulfilled its purpose can be made easier. In particular, the predetermined breaking edge can be prepared, for example, by providing the sheet-like part with a reduced cross section in the vicinity of a surface of the object to be produced at which the sheet-like part is connected to the object. The sheet-like part can thus be peeled off the finished object manually with relative ease in order to remove it.

In another embodiment of the fourth and/or fifth method, the sheet-like part is formed with a perforation along a contour of the object in the region of a transition of the part to the object to be generated, in which the sheet-like part is attached to the object. Such a perforation can likewise simplify the removal of the sheet-like part from the object after it has fulfilled its purpose. The outlay for a subsequent cutting process is reduced since the sheet-like part can already be removed manually to a large extent. In this case, only small remnants of the sheet-like part remain on the component, which also reduces the effort involved in cleaning or deburring. Moreover, the perforation of the sheet-like part can offer the further advantage that, particularly in the case of powder bed methods, a powder that forms the starting material can trickle through the openings of the perforation and does not accumulate in certain regions, e.g. in an angle between the object and the sheet-like part. This can contribute to improving safety during generative manufacture when using powder materials, especially often reactive metal powders, and furthermore helps in reducing material losses. This, in turn, can have an advantageous effect on manufacturing costs since less of the powdered starting material is lost.

In a development of the fourth and/or fifth method, the sheet-like part can be formed with a perforation and a predetermined breaking edge along a contour of the object in the region of the transition of the part to the object to be generated, in which the sheet-like part is attached to the object.

In one embodiment of the fifth method, the sheet-like part can be built up in such a way that the apertures are of diamond-shaped design. Diamond-shaped apertures offer the advantage that they can have surfaces which slope relatively steeply to the base, that shallow sections are avoided and that, as a result, the sheet-like part with the diamond-shaped apertures is, in turn, built up automatically without additional support. Moreover, diamond-shaped apertures can be arranged in a nested pattern which saves material.

In other embodiments of the fourth, fifth and/or sixth method, the perforation can be formed by circular or oval or diamond-shaped openings in the sheet-like part. As an alternative, openings, the inner surface of which forms a section of a spherical surface, can be provided in the sheet-like part in order to form the perforation. A perforation having oval openings, for example, can be advantageous, in particular, when the sheet-like part is built up obliquely to the buildup direction of the object. By virtue of the oval, e.g. elliptical, geometry of the holes, a gentler change in the cross section of the sheet-like part can be made possible. In the case of a powder bed method, for example, in which surfaces are to be irradiated with the aid of a laser, an abruptly increased heat input is avoided by the oval configuration. Cracks caused by the heat input can thus be avoided.

The sheet-like part of the fourth, fifth and/or sixth method is designed, in particular, as a supporting plate.

In one embodiment of the fifth method, the sheet-like part is built up substantially vertically on a base or supporting platform, between the object and the base or supporting platform. Thus, effective linear support can be achieved by the sheet-like part.

The embodiments and developments mentioned below, in particular, can be applied to all the methods according to the disclosure herein.

In embodiments of the disclosure herein, a powder bed method is used for the generative manufacture of the object and of the supporting structure. However, it is likewise conceivable to generate the object and the supporting structure by other methods known to a person skilled in the art as methods for generative manufacture.

Methods that may be considered for generative manufacture in embodiments of the disclosure herein are, in particular, selective laser sintering (SLS), selective laser melting (SLM) or electron beam melting (EBM), in which a starting material in powder form is applied in layers to a base and irradiated in certain areas by a laser or electron beam.

As an alternative, however, other methods, e.g. direct metal laser sintering (DMLS), selective heat sintering (SHS), fused deposition modeling (FDM), laminated object manufacturing (LOM), direct ink writing (DIW), binder jetting, electron beam freeform fabrication (EBF), stereolithography (SL) or rapid plasma deposition, may be considered for generative (additive) manufacture.

In a preferred embodiment of the disclosure herein, it is possible in particular, for the object and the supporting structure to be generated by generative manufacture from a metal material. In other words, the object and the supporting structure are thus produced from metal by 3-D printing.

In other embodiments, metals that can be selected from a group comprising aluminum, aluminum alloys, titanium, titanium alloys, steels, especially nickel-based steels, or nickel base alloys may be considered as metal materials for the formation of the object and of the supporting structure. However, other metals that are suitable for the object and can be processed by generative manufacturing methods could also be considered.

Even if the disclosure herein can be applied to advantage especially in the context of generative manufacture of the object and of the supporting structure from metal, application in the context of the production of an object and of a supporting structure from other materials, e.g. suitable plastics or ceramic materials, is likewise conceivable.

In one embodiment of the disclosure herein, after generative manufacture of the object, the object together with the supporting structure can be subjected to a heat treatment, in particular to hot isostatic pressing (HIP) using an elevated temperature and elevated pressure.

In other embodiments, the object can furthermore be subjected, after such a heat treatment, to machining, wherein the supporting structure can be removed even before machining, during machining or at the end of or after machining. If it is not required during heat treatment, the supporting structure can alternatively already be removed directly after the conclusion of the buildup of the object in layers.

In particular, the sheet-like parts, the arch or arches, the struts and the supporting substructure can be built up in layers from the same starting material as the object.

In this case, provision is preferably made, in other embodiments of the disclosure herein, for the sheet-like part, the arch or the arches and the strut or struts each to be built up in layers with the aid of a device for generative manufacture by the same processing parameters as for the actual object to be generated. On the other hand, the supporting substructure of a different character, which is built up, in particular, as a delicate and/or fragile structure, is built up in layers with the selection of processing parameters which differ from the processing parameters for the buildup of the object, the sheet-like parts, the arches and the struts.

In particular, it is possible in developments of the disclosure herein for the supporting substructure to be created with the aid of "magics" software supplied by a company called Materialise, Leuven, Belgium.

The above embodiments and developments can be combined in any way desired, provided this is sensible. Further possible embodiments, developments and implementations of the disclosure herein also include combinations, not explicitly stated, of features of the disclosure herein described above and below in respect of the illustrative embodiments. In particular, a person skilled in the art will also add individual aspects as improvements or supplementary measures to the respective basic form of the disclosure herein.

It should be mentioned that the abovementioned embodiments and developments can be applied similarly to the component according to the disclosure herein and to the computer-readable medium provided according to the disclosure herein.

Furthermore, a plurality or all of the supporting structures provided according to the first to sixth methods according to the disclosure herein and the embodiments thereof can also be employed in combination with one another in a generative production method.

BRIEF DESCRIPTION OF THE DRAWINGS

The disclosure herein is explained in greater detail below by the illustrative embodiments shown in the schematic figures. Here.

The attached figures are intended to impart a greater understanding of the embodiments of the disclosure herein. They illustrate embodiments and, in conjunction with the description, serve to clarify principles and concepts of the disclosure herein. Other embodiments and many of the stated advantages will become apparent in light of the drawings. The elements of the drawings are not necessarily shown to scale relative to one another.

Unless otherwise stated, identical, functionally identical and identically acting elements, features and parts are each provided with the same reference signs in the figures of the drawings.

DETAILED DESCRIPTION

The illustrative embodiments described in greater detail below are explained in relation to the generative manufacture of an object as a semifinished product by 3-D printing thereof from a metal material. However, it is self-evident that the methods according to the following illustrative embodiments can also be employed in 3-D printing with other starting materials.

Figure 1:
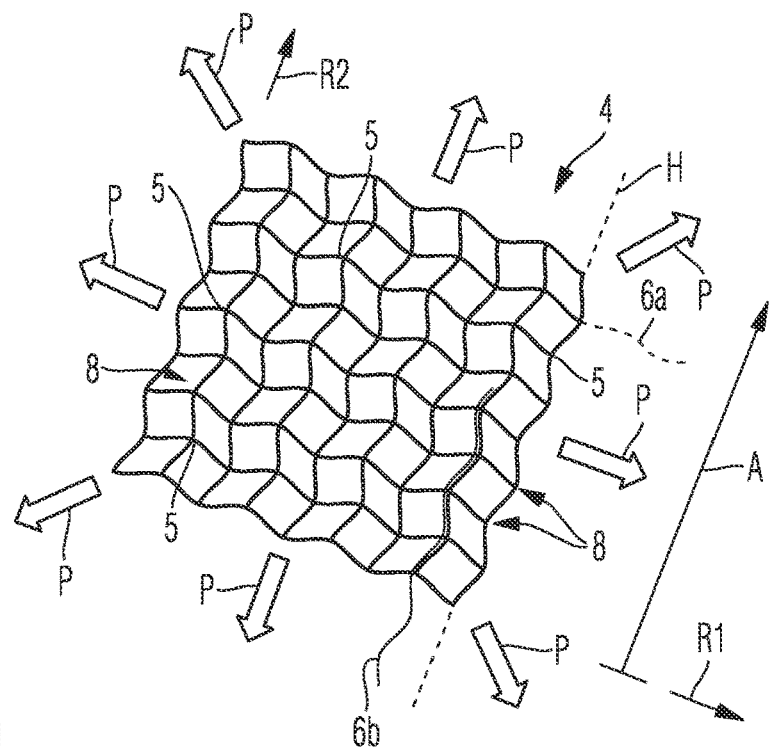
FIG. 1 shows a schematically depicted sheet-like part of a supporting structure for use in a method according to a first illustrative embodiment of the disclosure herein.

To illustrate a method according to a first illustrative embodiment for the production of an object by generative manufacture from a metal material by building up the object in layers, FIG. 1 shows a segment of a sheet-like part 4. A main surface of extent H, which is additionally indicated by arrows P in FIG. 1, is substantially planar. The sheet-like part 4 is built up in layers in buildup direction A in a generative manufacturing method. During this process, the sheet-like part 4 is formed with a multiplicity of bulges 5. The bulges 5 protrude from the main surface of extent H on both sides of the main surface of extent H, indicated schematically in FIG. 1. The bulges 5 are formed by forming the sheet-like part 4 in two directions R1, R2 extending transversely to one another, in each case with a corrugated shape 6a and 6b, see FIG. 1.

Figure 2:
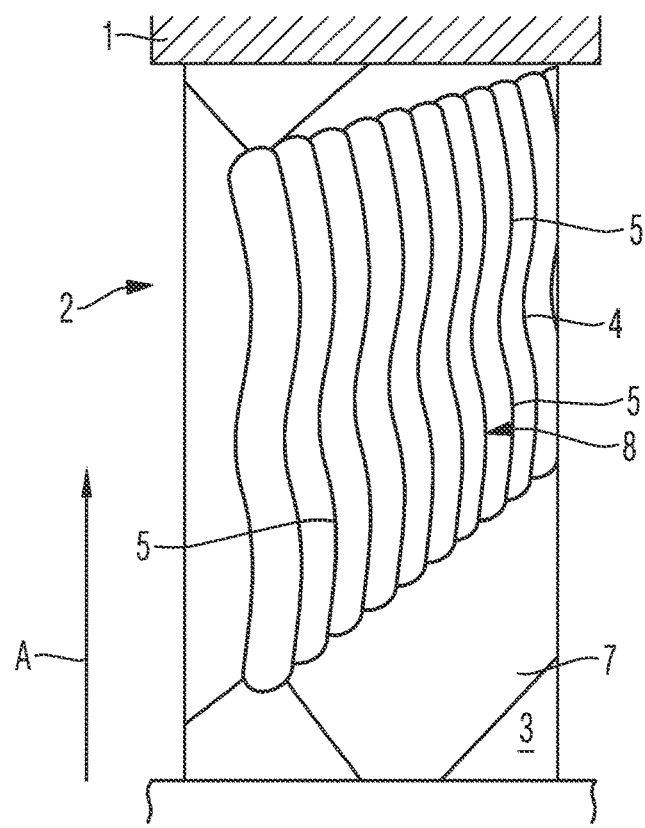
FIG. 2 shows a supporting structure having a sheet-like part, which has been built up by the method according to the first illustrative embodiment, in perspective.

During the manufacture of an object 1, which is shown only indicatively in FIG. 2, in which both the object 1 and a supporting structure 2 containing the sheet-like part 4 are built up in layers, the object 1 is attached via the supporting structure 2 to a base 3, on which the generative layered buildup takes place, and is thus fixed and supported relative to the base 3. FIG. 2 depicts the fact that in this case the sheet-like part 4 projects upright from the base 3, in particular substantially along the buildup direction A, along which the object 1 and the supporting structure 2 are built up in layers. In the first illustrative embodiment, the buildup direction A corresponds to a vertical direction parallel and opposite to a direction of action W of gravity, and thus the main plane of extent H of the sheet-like part 4 is aligned substantially perpendicularly to the substantially horizontal base 3. The sheet-like part 4 is attached via a foot 7 to the base 3, which forms a supporting platform.

In the first illustrative embodiment, the object 1 and the supporting structure 2 are manufactured additively from a metal material. During this process, the object 1 and the supporting structure 2 are subjected to stresses by the welding process. The configuration of the supporting structure 2 with the sheet-like part 4 having the bulges 5 helps to prevent the formation of cracks, especially in the supporting structure 2 due to these stresses. The supporting structure 2 fixes the object 1 relative to the base 3 and prevents impermissible deformations of the object 1 due to such stresses but is sufficiently compliant by virtue of the bulge structure to prevent the formation of cracks in the supporting structure 2. As a result, the reliability of the process during the buildup of the object 1 is considerably enhanced, wherein such attachment by the supporting structure 2 can be implemented in a simple manner. By the bulges 5, limited deformation of the supporting structure 2 is allowed.

The sheet-like part 4 forms a compliant structure, which produces compliance in the planar surface H by virtue of its bulging on both sides of the main surface of extent H. The sheet-like part 4 can thus give way somewhat in the directions indicated by arrows P in FIG. 1, for example. By varying the thickness, i.e. height or amplitude, of the bulges 5, the arrangement thereof and/or by capping bulge tips 8 (not depicted), the compliance can be controlled in detail. Both compliance by deformation in the main surface of extent H by elongation or compression and bending of the sheet-like part 4 around an axis in the main surface of extent H are conceivable.

By attaching the object 1 to the base 3 by the supporting structure 2 as shown in FIGS. 1 and 2, the disadvantages of excessively rigid and also of excessively compliant attachment of the object 1 can be avoided in an effective manner.

Figure 3:
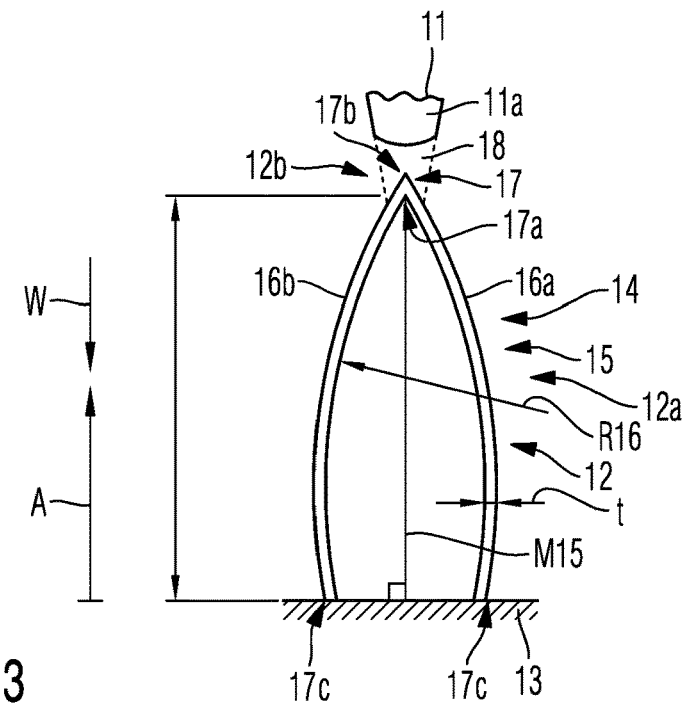
FIG. 3 shows an arch having two arch segments, wherein each of the arch segments is formed by a single circular arc segment, for use in a method according to a second illustrative embodiment of the disclosure herein.

To illustrate a second illustrative embodiment of the disclosure herein, an arch 15 is depicted schematically in FIG. 3, wherein the arch 15 is formed with two arch segments 16a, 16b. The arch segments 16a, 16b converge in a buildup direction A and meet at a tip 17 of the arch 15. The arch segments 16a and 16b are symmetrical with respect to a center line M15 of the arch 15, wherein each of the arch segments 16a, 16b is formed by a segment of a circular arc with the radius R16. In the case of the second illustrative embodiment too, the buildup direction A corresponds substantially to a vertical direction.

In FIG. 3, the arch 15 for the second illustrative embodiment is depicted two-dimensionally in a cross-sectional view, although it is self-evident that the arch 15 is built up as a three-dimensional body that has the substantially constant cross-sectional profile shown in FIG. 3 in a direction perpendicular to the plane of the drawing in FIG. 3.

In FIG. 3, reference sign 11 denotes an object to be generated in layers by generative manufacture, and reference sign 13 denotes a base. The arch 15 is part of a supporting structure 12 for an overhanging section 11a of the object 11.

In the illustrative embodiment shown in FIG. 3, the arch 15 is built up in layers, starting from the base 13. In order to support the overhanging section 11a, which is of limited sideways extent in FIG. 3 and which can be of narrow and long shape in this illustrative embodiment, for example, against the action of gravity, the arch 15 forms an arch structure 14 in a first region 12a of the supporting structure 12 in FIG. 3. During the generative buildup of the supporting structure 12 in layers, a finely divided, delicate and fragile supporting substructure 18, which is indicated only schematically in FIG. 3, is built up in layers on the arch structure 14, in the region of the upper end of the arch 15, close to the tip 17, in FIG. 3, on sections of the outside of the arch 15 in a second region 12b of the supporting structure. By the supporting substructure 18, the overhanging section 11a of the object 11 can be provided with surface support. A large part of a distance between the base 13 and the overhanging section 11a of the object 11 can thus be bridged by the arch 15, thereby enabling the overhanging section 11a to be supported precisely and accurately by the supporting substructure 18. Over short distances, such a supporting substructure 18 of a different character from the arch 15, being delicate and fragile, is effective for surface support.

In one variant of the second illustrative embodiment, a narrow overhanging section 11a of the object 11 could be supported directly by the upper region of the arch 17, without the interposition of the delicate, fragile supporting substructure 18.

A wall thickness t of the arch 15 can be 1.5 mm, for example. The arch segments 16a, 16b are connected in the region of the tip 17 via a rounded portion 17a (not shown depicted specifically in FIG. 3) on the inside of the arch 15, and the tip 17 itself can likewise be provided with a rounded portion 17b on the outside of the arch 15. Moreover, rounded portions 17c can be provided in regions in which the arch segments 16a, 16b stand on the base 13. By introducing radii into the rounded portion, local stresses can be reduced.

Figure 4:
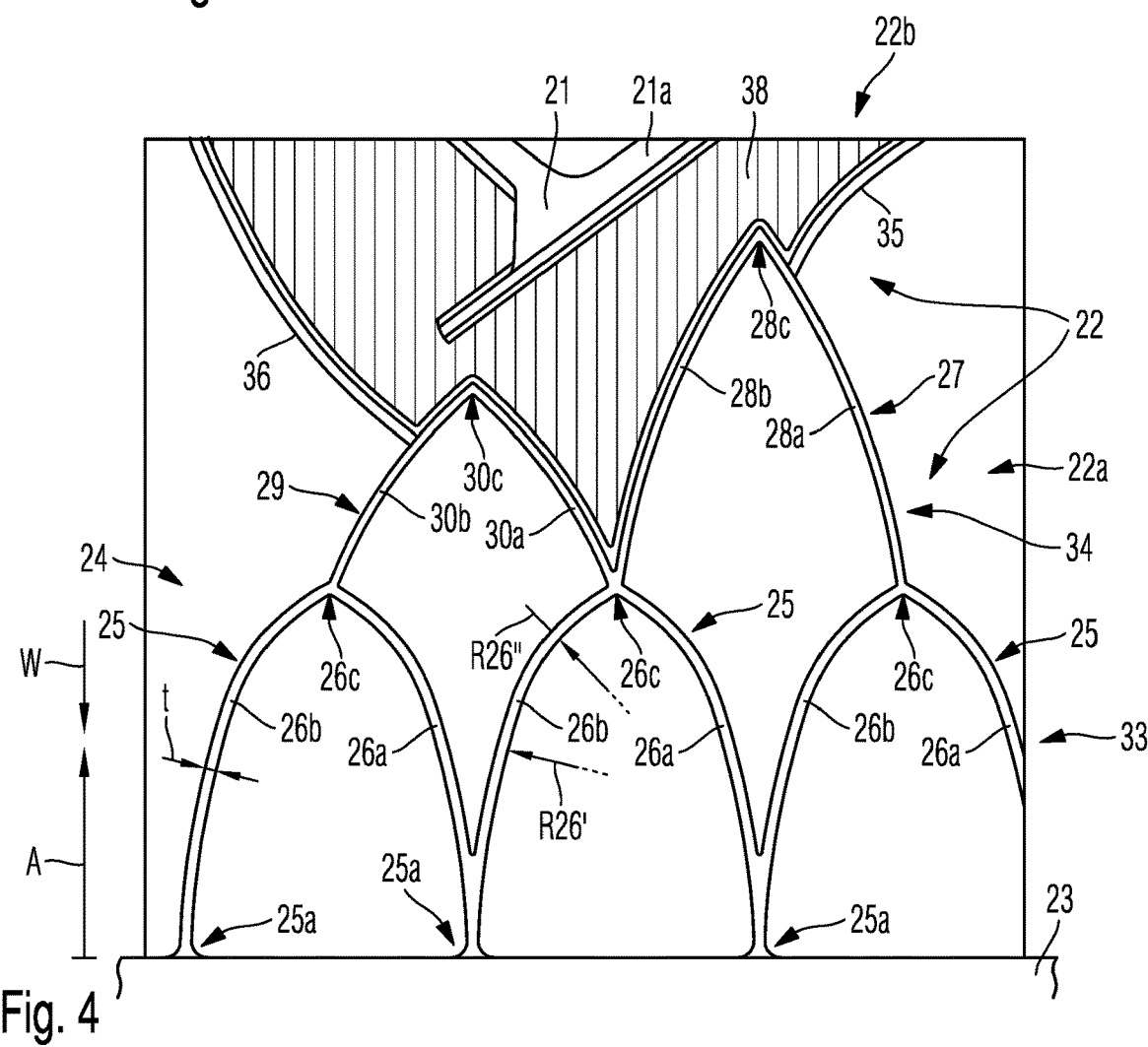
FIG. 4 shows a supporting structure having an arch structure and a supporting substructure of a different character, as well as a section of an object, as these have been built up in a method according to a third illustrative embodiment of the disclosure herein, in a cross-sectional view of the arch structure.

A method for producing an object 21 by generative manufacturing by building up the object 21 in layers according to a third illustrative embodiment is illustrated in FIG. 4. FIG. 4 shows how, according to the third illustrative embodiment, a supporting structure 22 has additionally been built up in layers on a base 23, which is once again a supporting platform.

In a first region 22a of the supporting structure 22, an arch structure 24 having a plurality of arches 25, 27, 29 has been built up in layers. Three arches 25 are provided, each being of intrinsically symmetrical construction and each having two arch segments 26a and 26b, which each converge at a tip 26c. The arch segments 26a, 26b thus converge in the buildup direction A.

Arch 27 is likewise of inherently symmetrical construction and has two arch segments 28a, 28b, which once again converge in the buildup direction A and meet at a tip 28c. Arch 29 is likewise of inherently symmetrical construction and has two arch segments 30a, 30b, which meet at a tip 30c.

The supporting structure 22, see FIG. 4, is constructed in such a way that the arches 25, 27, 29 are arranged one above the other in two tiers 33 and 34. In this arrangement, the adjacently built-up arches 25 form a lowermost tier 33, the arches 25 of which have been built up in layers directly on the base 23, while the two arches 27 and 29 of different heights form the next, second tier 34, which is arranged above tier 33. Arches 29 and 27 are each connected to two arches 25 at the respective tips 26c thereof. The arches 25, 27, 29 of the arch structure 22 form a stable supporting structure which is capable of bridging a relatively large distance between the base 23 and the object 21 in the buildup direction A, i.e. along the vertical.

The supporting structure 22 furthermore has a second region 22b, wherein the supporting structure 22 is embodied in region 22b with a supporting substructure 38 formed in a different way from the arches 25, 27, 29. The supporting substructure 38 is relatively delicate and finally divided and, in this way, is capable of supporting the overhanging section 21a of the object 21 over a large area. The supporting substructure 38 has furthermore been built up in layers in such a way that it is relatively fragile, making it easier to remove, once it has fulfilled its purpose. FIG. 4 illustrates how the supporting substructure 38 is considerably shortened along the buildup direction A with the aid of the arch structure 24. Thus, the supporting substructure 38 does not have to fill the entire distance between the base 23 and the section 21a of the object 21; instead, the arch structure 24 and the supporting substructure 38 are formed in such a way that the supporting substructure 38 is supported by the arch structure 24, and the section 21a is supported against the arch structure 24. Arches 27 and 29 each make available at least part of their outsides for this purpose. The arch-type configuration thereof advantageously considerably shortens the supporting substructure 38, wherein the arch segments 28a,b and 30a,b are constructed in such a way that they can be self-supporting while being produced generatively in layers. In other words, the arches 27, 29 do not have to be self-supporting during the printing of the arches 27 and 29. The same also applies to the arches 25 and the arch segments 26a,b thereof.

Stacking and nesting the arches 25, 27, 29 makes it possible to effectively shorten the vertical extent of the surface support achieved by the supporting substructure 38, even in the case of a relatively great height above the base 23, and for the support of more extensive overhanging sections 21a. Material for the supporting substructure 38 is saved and, furthermore, the section 21a of the object 21 can advantageously be supported in a more stable and accurate fashion, the geometry of section 21a and the position thereof is better maintained during 3-D printing, and costs due to faults caused by interrupting a manufacturing cycle or by a defective object are avoided.

In the case of the arches 25, 27 and 29 in FIG. 4, the arch segments 26a,b, 28a,b and 30a,b, even if different from one another, are each constructed from two circular arc segments. This is particularly clear in FIG. 4 in respect of the arches 25 of the lowermost level 33, in which, in the upper region thereof, close to the tip 26c, a smaller radius R26" is provided, while the selected radius R26' is larger than R26" in the lower region of arch 25. By varying the radii of the circular arc sections from which the arch segments 26a,b, 28a,b, 30a,b are formed, it is possible to establish a suitable local slope of the arch segments 26a, 26b, 28a, 28b, 30a, 30b and, furthermore—depending on the available space—also to save space for the arches 25, 27, 29. Arch segments, each formed with a maximum of two circular arc segments, can advantageously be implemented with a limited outlay.

FIG. 4 additionally shows arch sections 35 and 36, which are built up so as to project from outward-facing sides of arch segment 28a and arch segment 30b of arch 27 and 29, respectively. These arch sections enlarge the bearing or supporting surface available for the supporting substructure 38.

In foot regions 25a, in which the arches 25 have been built up upward, starting from the base 23, rounded portions are provided. Moreover, it is also possible, on the inside of the arch 25, 27, 29, in each case in the region of the tip 26c, 28c and 30c respectively, for the notch formed by the convergence of the arch segments 26a-b, 28a-b, 30a-b to be rounded with a radius of preferably between about 0.5 mm and about 1.0 mm in order to reduce stresses. A wall thickness t of the arches 25, 27, 29 can be 1.5 mm, for example. The region of the arches 27 and 29 adjoining the tips 26c can be configured and rounded in such a way that the wall thickness t is approximately maintained or at least not substantially undershot in these adjoining regions. Rounded portions can furthermore be provided at locations at which the arch sections 35, 36 adjoin the arch segments 28a and 30b, respectively, in order to mitigate notch stresses at these locations.

Figure 5:
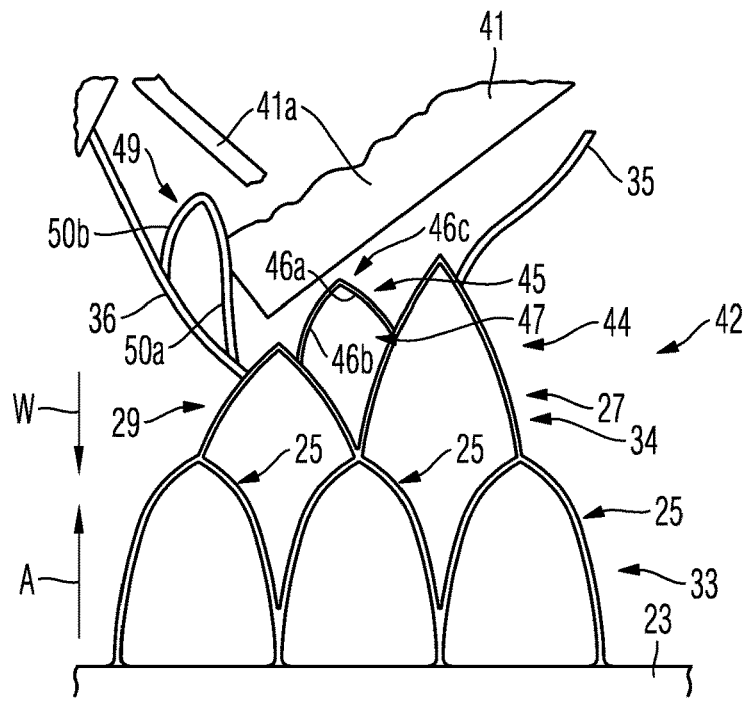
FIG. 5 shows an arch structure of a supporting structure as well as a section of an object, which have been built up in a method according to a fourth illustrative embodiment of the disclosure herein.
Figure 6:
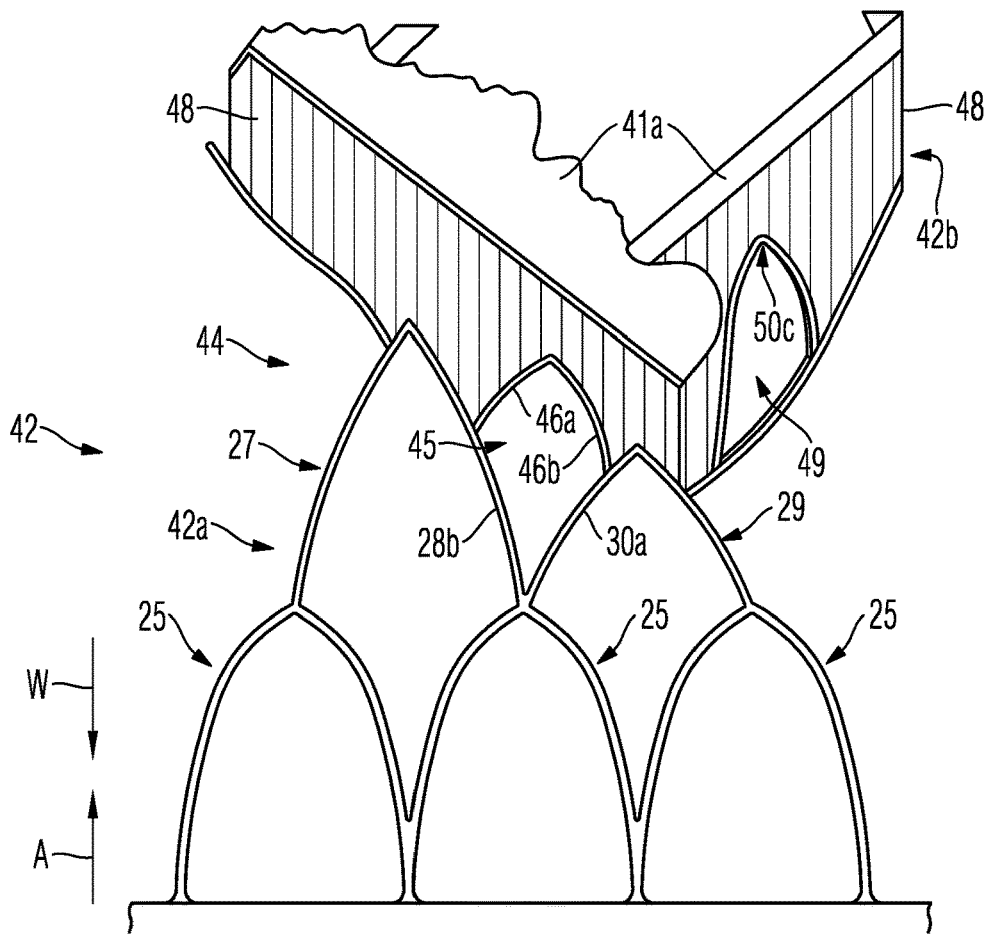
FIG. 6 shows the arch structure, the section of the object and a supporting substructure, which have been built up in a method according to the fourth illustrative embodiment, in a direction of view opposite to the illustration in FIG. 5.

FIGS. 5 and 6 shows an overhanging section 41a of an object 41, wherein, once again, a supporting structure 42 has been built up, this being a variant of the supporting structure 22 in FIG. 4 and having an arch structure 44 in a first region 42a. FIGS. 5 and 6 illustrate that an additional, further arch 45 has been built up between the two arches 27 and 29, between the mutually facing arch segments 30a and 28b thereof, wherein arch segments 46a and 46b of arch 45, which meet at a tip 46c, start from outer surfaces of arch segments 28b and 30a, respectively. It can furthermore also be seen from FIG. 5, for example, that the axis of symmetry or center line of arch 45 can slope slightly relative to the buildup direction A.

In the fourth illustrative embodiment in FIGS. 5 and 6, similarly to the third illustrative embodiment in FIG. 4, a delicate and fragile supporting substructure 48 is supported in a second region 42b of the supporting structure 42 by the arch structure 44 formed by arches 25, 27, 29 and 45. Similarly to FIG. 4, the arch structure 44 furthermore has the two arch sections 35 and 36, wherein, see FIG. 5, arch section 35, in particular, is provided with a curvature in two directions. It is furthermore possible, in the fourth illustrative embodiment, to build up on arch section 36 a further, asymmetric arch 49 having arch segments 50a,b and a tip 50c, to which the above statements relating to arches 25, 27, 29, 45 apply mutatis mutandis, where appropriate. As regards rounded portions in regions in which arch segments and/or arch sections adjoin one another, attention is drawn to the above statements relating to FIG. 4. Arch 45 can furthermore be regarded as forming an additional third tier 47 of the arch structure 44.

In the case of the illustrative embodiments in FIGS. 3 to 6, the supporting substructure 18, 38, 48 can in each case be generated, in particular, by the "magics" software supplied by a company called Materialise, Leuven, Belgium. By way of example, the arch structure 14, 24, 44 can bridge a vertical distance of 50 mm or more.

Figure 7:
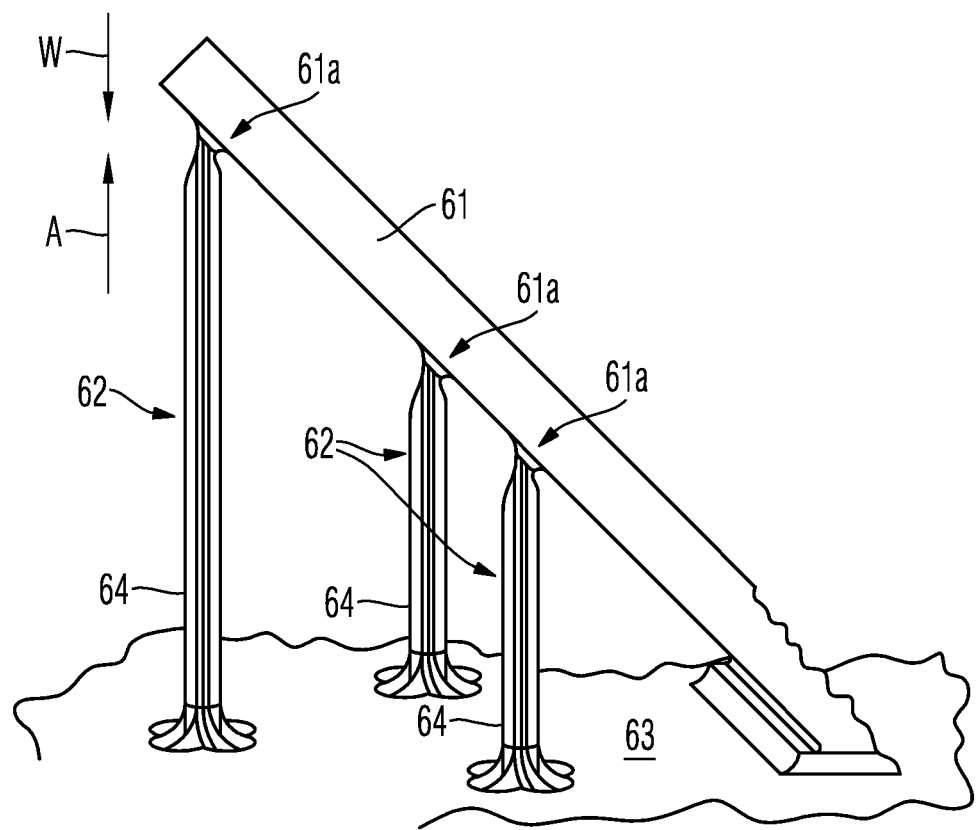
FIG. 7 shows an object and a supporting structure formed with struts, which have been built up in a method according to a fifth illustrative embodiment of the disclosure herein, in perspective.

A supporting structure 62 having a plurality of struts 64, which is likewise built up in layers according to a fifth illustrative embodiment as an object 61 is built up in layers during the generative manufacture thereof is shown by FIG. 7. Each of the struts 64 extends straight up vertically, substantially along a buildup direction A of the object 61 from a base 63, rests on the base 63 and provides point support to an overhanging section 61a of the object 61. In FIG. 7, the struts 64 extend between the base 63 and each section 61a.

Figure 12:
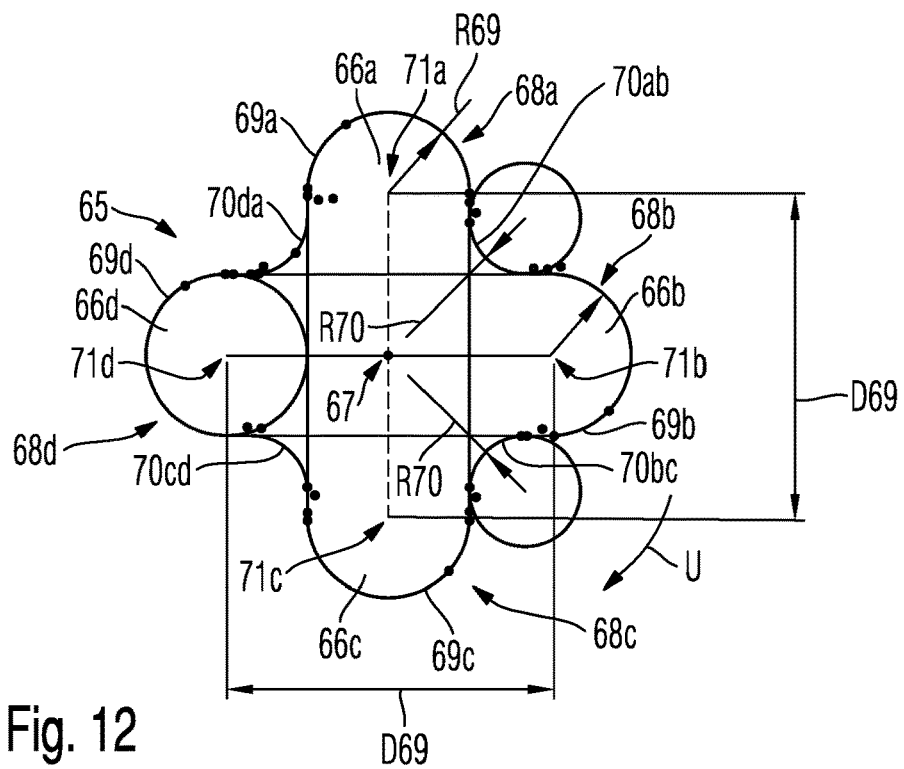
FIG. 12 shows a depiction designed to illustrate the cross-sectional shape of the struts as used in the method according to the fifth, sixth, seventh, eighth or ninth illustrative embodiment.

A cross-sectional shape 65 of each of the struts 64 is depicted in FIG. 12. The cross-sectional shape 65 has a cloverleaf-like shape, resembling a four-leaf clover, and has four leaf-type subregions 66a, 66b, 66c, 66d, which extend outward from a center 67 of the cross-sectional shape 65.

At its end 68a-d remote from the center 67, each of the subregions 66a-d ends with a semicircular shape 69a-d having a first radius R69, wherein, for the sake of clarity, the radius R69 is entered only for the semicircular shape 69a in FIG. 12. Subregions 66a and 66b, 66b and 66c, 66c and 66d as well as 66d and 66a that are adjacent to one another in the circumferential direction U of the cross-sectional shape 65 are connected to one another via a quadrant shape 70ab, 70bc, 70cd and 70da, respectively. The quadrant shapes 70ab, 70bc, 70cd and 70da each have a second radius R70, which once again is indicated only for quadrant shapes 70ab, 70bc in FIG. 12 for the sake of clarity. All the mutually adjoining subsections of the peripheral outer contour of the cross-sectional shape 65, see FIG. 12, merge tangentially into one another, as a result of which the cross-sectional shape 65 does not have any edges or sharp corners in its outer contour. In this way, it is possible to reduce the stress on a coating blade in an effective manner.

In FIG. 12, the second radius R70 is two thirds of the first radius R69, and therefore R69=1.5 R70. Circle centers 71a, 71c and 71b, 71d, starting from which the semicircular shapes 69a,c and 69b,d are each defined by the first radius R69, have a spacing D69 across the center 67 of the cross-sectional shape 65. In FIG. 12, D69 is four times the first radius R69, and therefore D69=4 R69. In a preferred example, the chosen value for R69 can be 1.5 mm.

In the illustrative embodiment illustrated in FIG. 7, the generatively produced object 61 can be subjected to a heat treatment, e.g. by hot isostatic pressing, after complete additive buildup. In the example shown in FIG. 7, the struts 64 are then removed, preferably before finish-machining.

Figure 8:
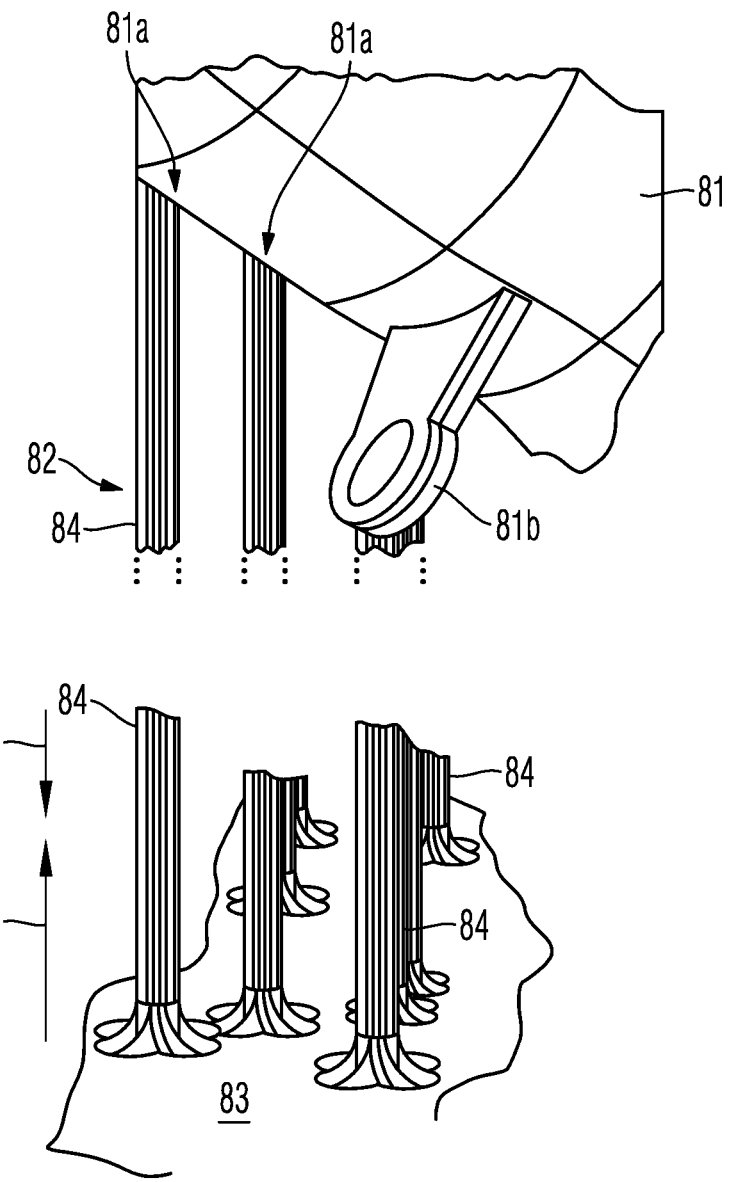
FIG. 8 shows a section of an object as well as parts of a supporting structure having struts, which have been built up in a method according to a sixth illustrative embodiment of the disclosure herein, in perspective.

A detail of a supporting structure 82, which, according to a sixth illustrative embodiment, has been built up in layers as an object 81 is built up in layers during the generative manufacture thereof, is shown by FIG. 8. By way of example, the object 81 can have a main body, indicated as a detail in FIG. 8, and one or more body regions projecting therefrom. Whereas a number of struts 84 of the supporting structure 82 support overhanging sections 81a of the main body of the object 81, for example, one or more other of the struts 84 can support overhanging section 81b of a projecting body region of the object 81. In FIG. 8, the struts 84 have been built up additively in layers together with the object 81 and project straight up from a base 83, substantially vertically and thus along the buildup direction A and parallel to a direction of action W of gravity.

The above statements in respect of the cross-sectional shape 65 of the struts 64, depicted in FIG. 12, also apply to the cross-sectional shape of the struts 84 in FIG. 8, which is likewise like a cloverleaf.

Figure 9:
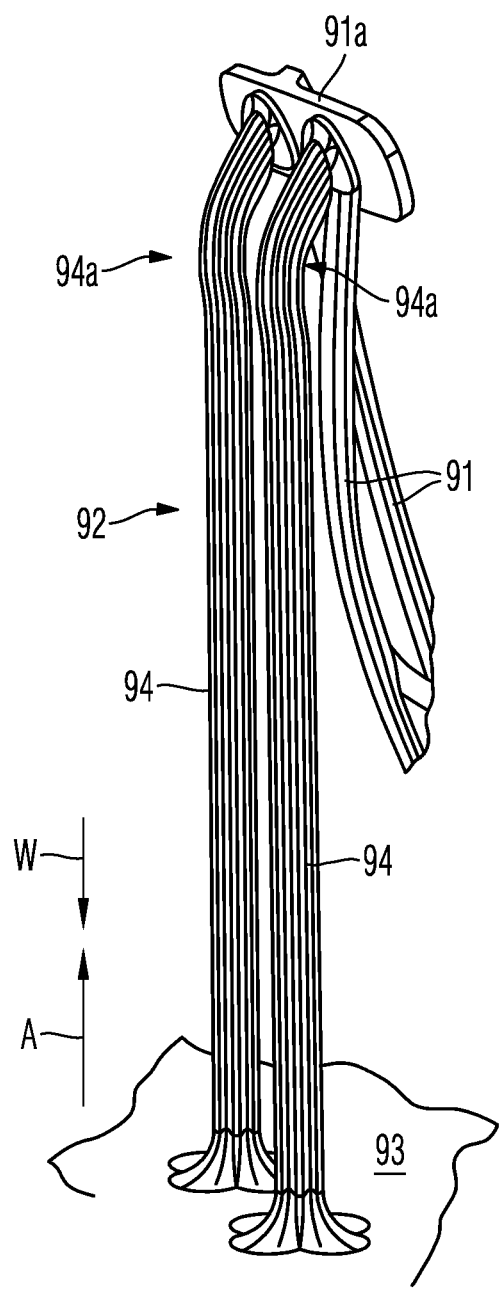
FIG. 9 shows a section of an object as well as parts of a supporting structure having struts, which have been built up in a method according to a seventh illustrative embodiment of the disclosure herein, in perspective.

Another supporting structure 92, which, according to a seventh illustrative embodiment, has been built up in layers as an object 91 is built up in layers during the generative manufacture thereof, is shown by FIG. 9, likewise as a detail. Once again, struts 94 of the supporting structure 92 extend from a base 93, overall substantially vertically along a buildup direction A up to a plate-type section 91a of the object 91, which is arranged so as to overhang obliquely and is supported by the struts 94. In the seventh illustrative embodiment, the object 91 is formed with a plurality of long, branched and bent arms but only a segment thereof is depicted in FIG. 9. The struts 94 can support the object 91 in an effective manner, especially also during a subsequent heat treatment.

The above statements in respect of the cross-sectional shape 65 of the struts 64 also apply to the cross-sectional shape of the struts 94 in FIG. 9, which is likewise like a cloverleaf.

In FIG. 9, the section 91a supported by the struts 94 is positioned obliquely to the base 93. In the seventh illustrative embodiment, the connection between each of the struts 94 and section 91a has been produced by forming each of the struts 94 in a curved manner, particularly in an upper region 94a thereof.

Figure 10:
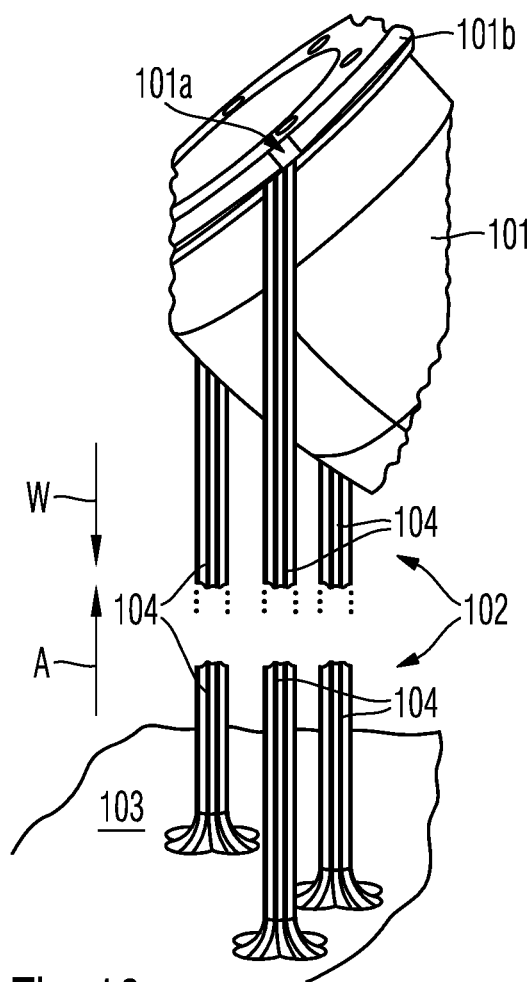
FIG. 10 shows a section of another object as well as parts of a supporting structure having struts, which have been built up in a method according to an eighth illustrative embodiment of the disclosure herein, in perspective.

FIG. 10 shows a detail of a supporting structure 102, which has been built up in layers as an object 101 has been built up in layers in a manner corresponding to an eighth illustrative embodiment. In the illustrative embodiment shown in FIG. 10, the object 101 is formed with a flange 101b. Struts 104 of the supporting structure 102 support overhanging sections 101a of the flange 101b and thus also the object 101 against a base 103, on which generative manufacture is performed. In FIG. 10, the struts 104 extend substantially vertically upward away from the base 103 along the buildup direction A and parallel to the direction of action W of gravity.

The cross-sectional shape of the struts 104 in FIG. 10 is also of cloverleaf-type design and the statements in respect of the cross-sectional shape 65 of the struts 64, see FIG. 12, apply in similar fashion with regard to FIG. 10.

Figure 11:
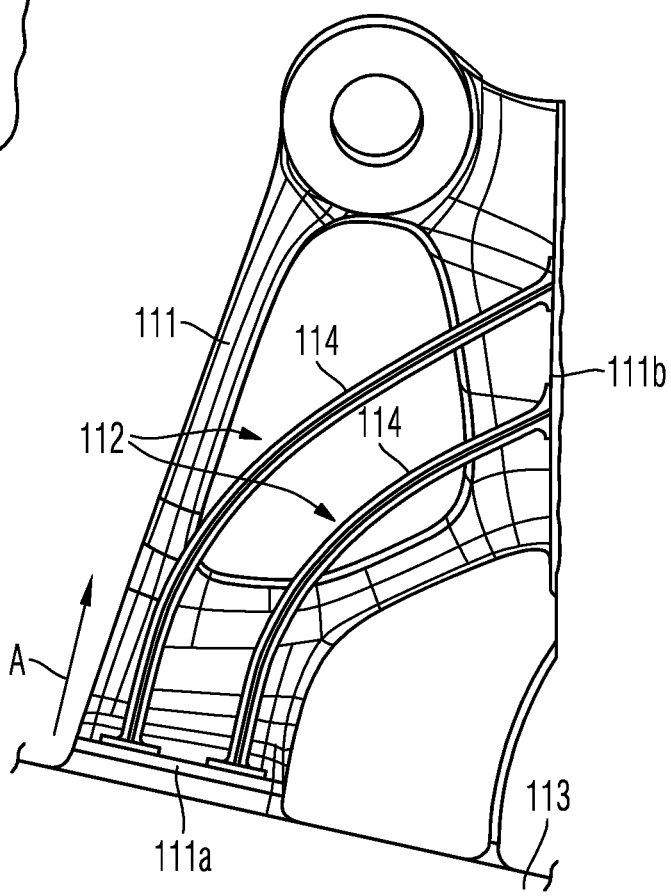
FIG. 11 shows a section of an object as well as parts of a supporting structure having struts, which have been built up in a method according to a ninth illustrative embodiment of the disclosure herein, in a side view.

FIG. 11 shows a supporting structure 112, which has been built up in layers as an object 111 has been built up in layers in accordance with a ninth illustrative embodiment. The supporting structure 112 stabilizes generatively produced sections 111a and 111b of the object 111 relative to one another. For this purpose, struts 114 of the supporting structure 112 each extend between sections 111a and 111b. In order to connect the two sections 111a and 111b in a stabilizing manner in this way, each of the two struts 114 depicted diagrammatically in FIG. 11 is of curved design along its longitudinal direction. A base 113, on which the layered buildup of the object 111 and of the supporting structure 112 has been performed, and a buildup direction A are likewise indicated in FIG. 11.

By the struts 114, stabilization of section 111b, for instance, against the base 113 can be achieved, which can, in turn, prove advantageous during a subsequent hot isostatic pressing operation, for instance. The struts 114 advantageously furthermore stabilize the sections 111a and 111b relative to one another during a machining operation which takes place as part of the further manufacturing process. Oscillation or vibration of the sections 111a, 111b relative to one another is thus avoided or reduced. The quality achieved in the machined surfaces of the object 111 can be further improved in this way. In particular, it becomes possible to avoid "chatter marks" during the milling of the object 111.

The cross-sectional shape of the struts 114 in FIG. 11 is also of cloverleaf-type design, as explained in detail above in respect of the cross-sectional shape 65 of the struts 64.

Whereas, in the case of the illustrative embodiments in FIGS. 8, 9 and 10, the building up of the object 81, 91, 101 and of the supporting structure 82, 92, 102 in layers can in each case be followed by a heat treatment, e.g. by hot isostatic pressing, and the supporting structure 82, 92, 102 is removed after heat treatment before or in the course of machining, the supporting structure 112 in the ninth illustrative embodiment, shown in FIG. 11, remains connected to sections 111a and 111b both during such a heat treatment and during machining. In this way, the supporting structure 112 can perform its stabilizing function during machining. In the illustrative embodiment in FIG. 11, the supporting structure 112 with the struts 114 is separated from the object 111 only after the cutting process or at the end thereof.

Figure 13:
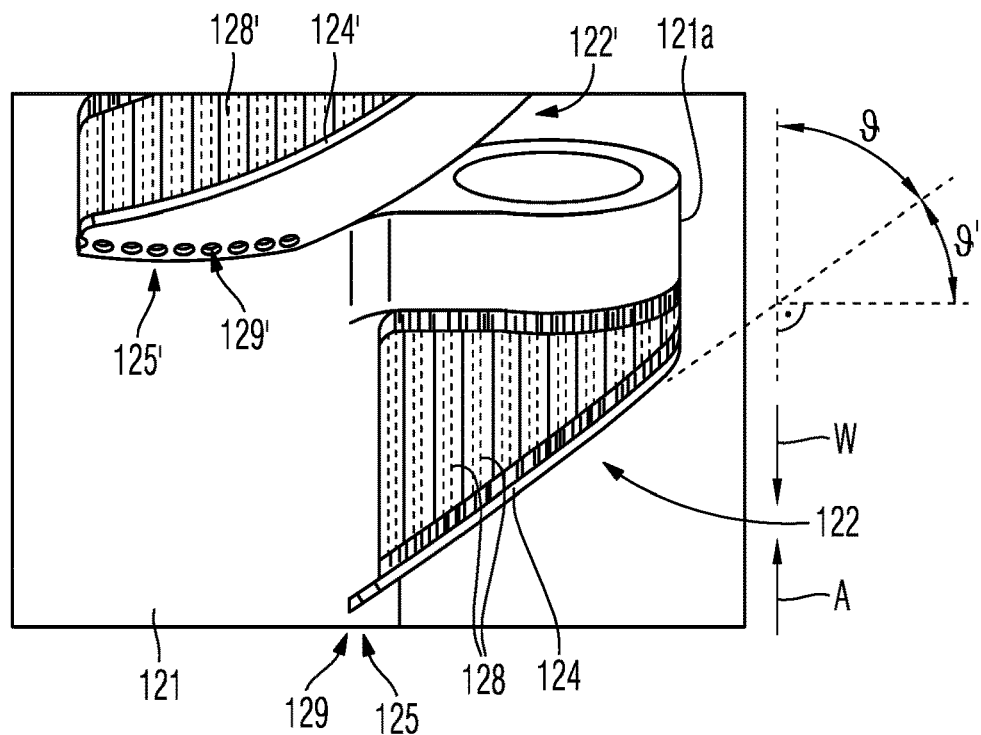
FIG. 13 shows a section of an object as well as parts of supporting structures having sheet-like parts and supporting substructures of a different character, which have been built up in a method according to a tenth illustrative embodiment of the disclosure herein, in perspective.

A method for producing an object 121 by generative manufacturing in accordance with a tenth illustrative embodiment is illustrated by FIG. 13. The object 121, only part of which is shown in FIG. 13, has a projecting part, which has the form of a tab with an opening or an eye in FIG. 13, by way of example. The projecting part projects substantially horizontally from a substantially vertical outer surface of the object 121 and thus forms an overhanging section 121*a* of the object 121. A buildup direction A, along which the object 121 is built up in layers, is also indicated in FIG. 13.

The supporting structure 122 is likewise built up in layers in the buildup direction A, at least periodically during the generative buildup of the object 121, and is used to support section 121*a*, which extends at an angle of about 90 degrees to the buildup direction A. The buildup direction A corresponds to the vertical direction and is thus parallel to the direction of action W of gravity. Section 121*a* can therefore not support itself during the buildup in layers.

In the method according to the tenth illustrative embodiment, section 121*a* is built up to a greater height above a base, which is not shown in FIG. 13. A vertical extent of the supporting structure 122, which is limited along the buildup direction A, is achieved in FIG. 13 by virtue of the fact that the supporting structure 122 has a sheet-like part 124 designed as a supporting plate. The sheet-like part 124 is built up in layers during the generation of the object 121, i.e. is printed at the same time. The sheet-like part 124 is built up in such a way that the sheet-like part 124 is connected in a region 125 to the object 121 and furthermore projects obliquely forward from the object 121 in the buildup direction A. In relation to the buildup direction A and the direction of action W of gravity, which is parallel thereto, an angle ϑ at which a main surface of extent of the sheet-like part 124 extends is between about 30 degrees and about 50 degrees and no more than about 53 degrees. In other words, in relation to a substantially horizontal base, this main surface of extent slopes at an angle ϑ' of between 40 degrees and 60 degrees and by at least about 37 degrees. With such a choice of angle, it is possible to avoid a situation where the sheet-like part 124 once again has to be self-supporting.

The object 121 in FIG. 13 is formed with a rounded cross section and can have an elongate shape in the vertical direction. FIG. 13 shows that, in the transitional region 125, in which the sheet-like part 124 adjoins the object 121 and is connected thereto, the part is geometrically matched to the outer contour of the object 121 and therefore follows this rounded outer contour, and after the complete buildup of the sheet-like part 124, extends in such a way as to project in the manner of a tongue or tab from the object 121.

On its side facing upward in FIG. 13, the sheet-like part 124 has a structure 128 which serves to provide extended-area support to the overhanging section 121*a*, is itself supported on the sheet-like part 124 and is of different design to the sheet-like part 124. The structure 128 is referred to below as supporting substructure 128, forms a component part of the supporting structure 122 and has been built up in layers in such a way during the method according to the tenth illustrative embodiment that the supporting substructure 128 has a relatively fragile and delicate construction.

Providing the sheet-like part 124 advantageously makes it possible to shorten the supporting substructure 128 used for surface support. Thus, the supporting substructure 128 does not have to be built up on a base which is possibly at a great distance in the vertical direction, i.e. in the buildup direction A. This allows precise extended-area support of section 121*a*. Deformation or cracking of the supporting substructure 128 is avoided and, furthermore, material and printing time for the substructure can be saved.

A further supporting structure 122' for a further overhanging section (not shown in the drawing) of the object 121, which is similar to supporting structure 122, is likewise shown diagrammatically in FIG. 13, wherein supporting structure 122' once again has a sheet-like part 124', which, like part 124, projects from the object 121, is connected to the object 121 in a region 125' of a transition of the part 124' to the object 121 and carries a supporting substructure 128'.

The supporting structures 122 and 122' in FIG. 13 have been provided with a perforation 129 and 129', respectively, along a contour of the object 121 in the region 125, 125' during the building up of the structures in layers. On the one hand, in the case of powder bed methods, the perforation 129, 129' avoids accumulation of powdered starting material in a corner region between the object 121 and an upper side of the sheet-like part 124 and 124', respectively. On the other hand, the perforation 129, 129' can make it easier to separate the sheet-like part 124, 124' when it is no longer required. Separation can be performed manually along the perforation 129, 129', for example, e.g. by breaking off, thereby facilitating subsequent machining to remove remaining remnants of the sheet-like parts 124, 124' as well as cleaning and/or deburring.

Figure 14:
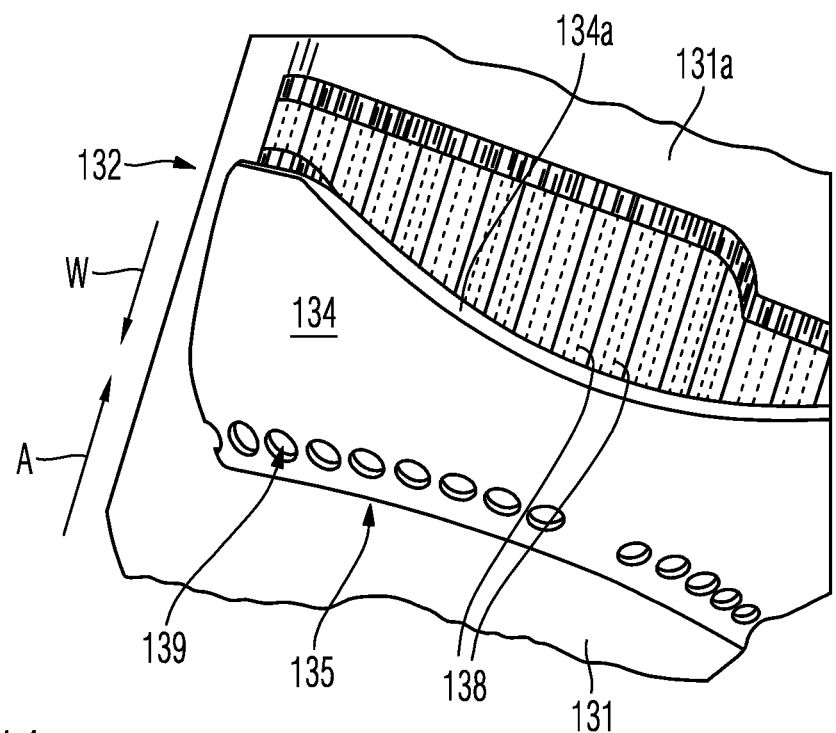
FIG. 14 shows a section of an object as well as parts of a supporting structure having a sheet-like part and a supporting substructure, which have been built up in a method according to an eleventh illustrative embodiment of the disclosure herein, in perspective.

A supporting structure 132 which is used in a method for producing an object 131 by generative manufacturing in accordance with an eleventh illustrative embodiment is shown by FIG. 14. The supporting structure 132 has a sheet-like part 134 and a supporting substructure 138, wherein the sheet-like part 134 is connected to the object 131 in a region 135. FIG. 14 shows that the geometric shape of the sheet-like part 134, particularly in the region of an outer edge 134*a* thereof, can be varied to match an overhanging section 131*a*, to be supported, of the object 131. A perforation 139 is provided in the region 135 in the eleventh illustrative embodiment as well. The illustrative embodiment in FIG. 14 represents a variant of the illustrative embodiment in FIG. 13, and therefore reference can additionally be made to the statements relating to FIG. 13.

The easily removable supporting substructures 128, 128' and 138 in FIGS. 13, 14 can be generated with the aid of the "magics" software supplied by a company called Materialise, Leuven, Belgium, for example.

Figure 15:
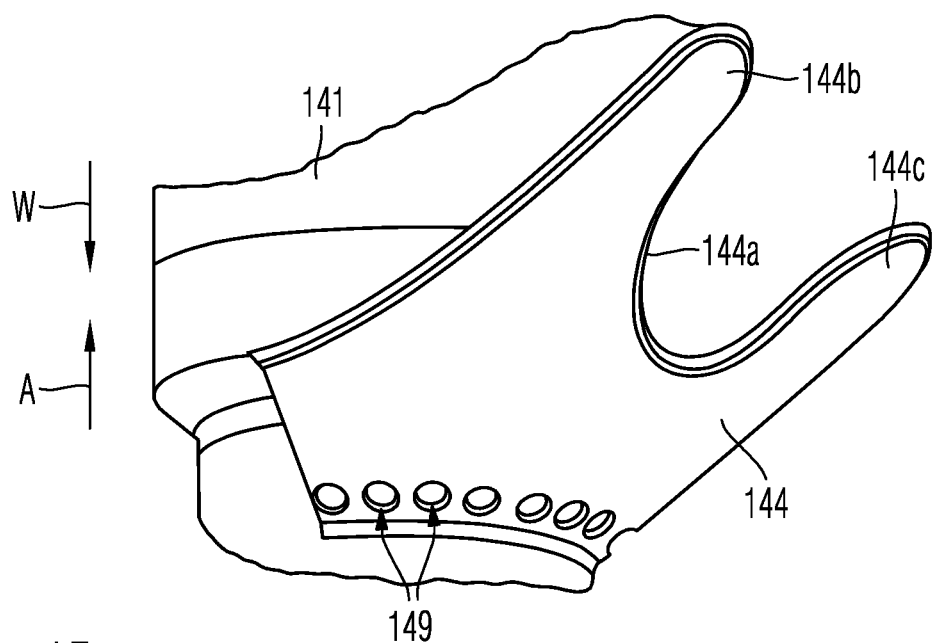
FIG. 15 shows a section of an object as well as a sheet-like part of a supporting structure, which have been built up in a method according to a twelfth illustrative embodiment of the disclosure herein, in perspective.

FIG. 15 illustrates a method for an producing object 141 by generative manufacturing in accordance with a twelfth illustrative embodiment, which once again represents a variant of the tenth illustrative embodiment. Once again, a supporting structure having a sheet-like part 144 is provided, wherein the sheet-like part 144 likewise has a perforation 149 along a contour of the object 141 and carries a fragile supporting substructure (not shown in FIG. 15) similar to structures 128, 128', 138. In the method according to the twelfth illustrative embodiment, an outer edge 144*a* of the sheet-like part 144 has been designed in such a way that the sheet-like part 144 has two distinct protruding tongue-like subregions 144*b* and 144*c*.

In variants of the tenth to twelfth illustrative embodiments, it is possible, in a manner corresponding to a thirteenth illustrative embodiment, to form a sheet-like part 154 with a predetermined breaking edge 156 in the region 155 of a transition between the part and an object to be generated, in which the sheet-like part 154 is connected to the object, instead of the perforation 129, 129', 139, 149 or in addition to the perforation 129, 129', 139, 149. The predetermined breaking edge or predetermined breaking point 156 can make it easier to peel the sheet-like part 154 manually off the object when it is no longer required.

Figure 16:
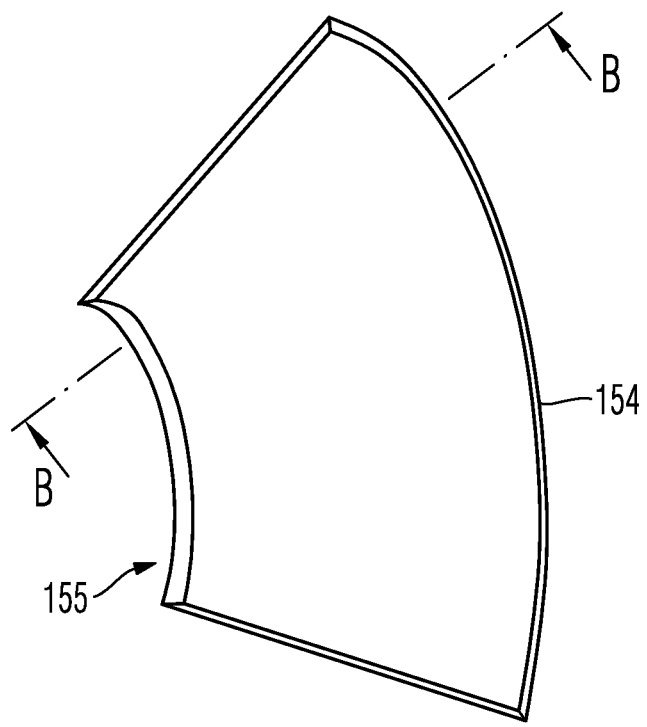
FIG. 16 shows a schematic depiction of a sheet-like part for use in a method according to a thirteenth illustrative embodiment of the disclosure herein.
Figure 17:
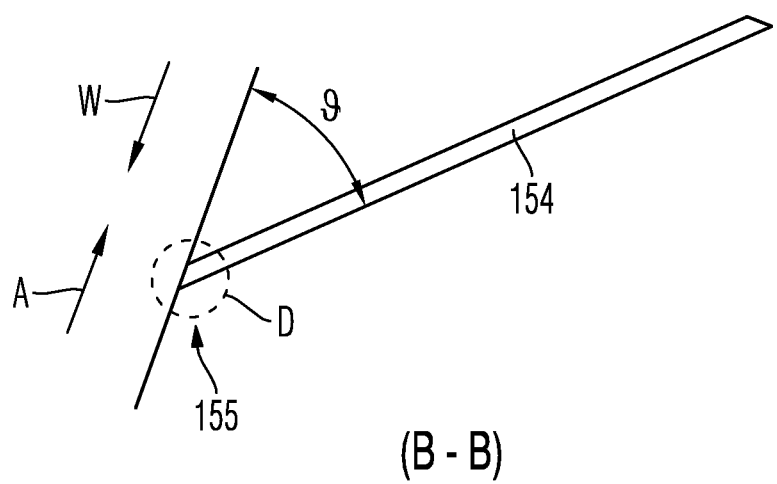
FIG. 17 shows a cross-sectional depiction of the sheet-like part in FIG. 16.
Figure 18:
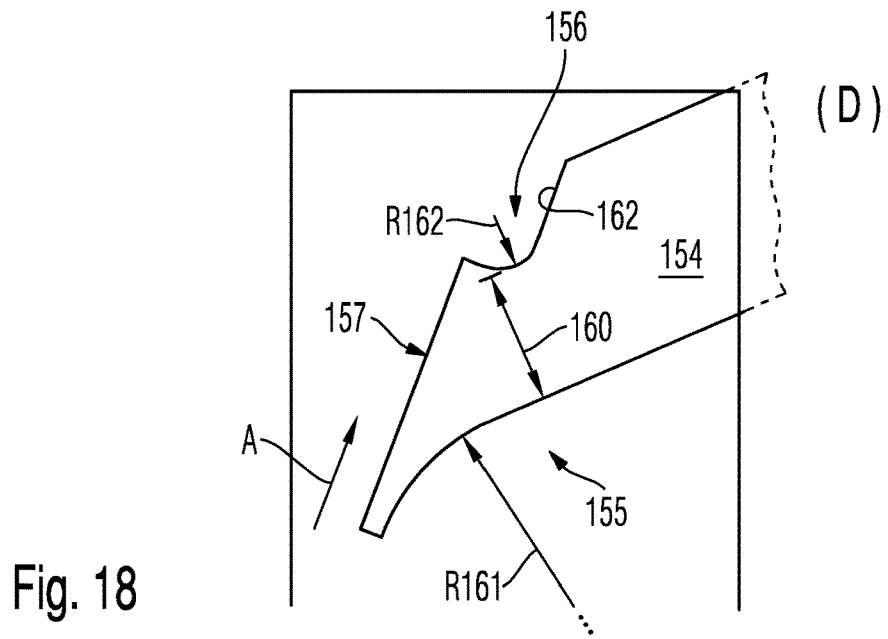
FIG. 18 shows a detail D from FIG. 17.

A sheet-like part 154 in accordance with the thirteenth illustrative embodiment is shown diagrammatically in FIGS. 16 to 18, wherein it is self-evident that the sheet-like part 154 is built up in layers together with the object (not shown in FIGS. 16-18), as in the illustrative embodiments in FIGS. 13 to 15. The sheet-like part 154 is designed as a supporting plate and, by way of example, is provided substantially with the shape of a frustoconical lateral surface segment, see FIG. 16. FIG. 17 shows a cross section B-B through the sheet-like part 154, wherein, once again, a slope angle ϑ of the sheet-like part 154 relative to the direction of action W of gravity is depicted. The above statements relating to FIG. 13 apply to the angle ϑ.

A detail D of FIG. 17 is shown in FIG. 18. The sheet-like part 154 is connected to the object to be produced generatively (likewise not shown in FIG. 18) in the transitional region 155 via a surface 157. For this purpose, the sheet-like part 154 is matched to the contour of the object to be produced in region 155. The predetermined breaking edge 156 is produced in such a way that the sheet-like part 154 is provided with a reduced cross section 160 in region 155 and thus in the vicinity of a surface of the object at which the sheet-like part 154 is connected to the object via the surface 157.

On a side of the sheet-like part 154 which is underneath when viewed in the buildup direction A, the part is provided in region 155 with a rounded portion having a radius R161. On the opposite side of the sheet-like part 154, which is at the top when viewed in the buildup direction A and on which the sheet-like part 154 encloses the acute angle ϑ with the direction of action W of gravity, the sheet-like part 154 has, in region 155, a reentrant portion 162, the bottom of which is provided with a rounded portion having radius R162. Radius R161 is considerably larger than radius R162. R161=1.0 mm and R162=0.2 mm can be chosen, for example. If, at the same time, the surface 157 via which the sheet-like part 154 is connected to the object is sufficiently large, the reduced cross section 160 close to the surface 157 can be achieved and allows simple removal of the part 154 after it has served its purpose.

As described above with reference to FIGS. 13-15, the perforation 129, 129', 139, 149 can be achieved by providing the sheet-like part 124, 124', 134, 144 in the region of the perforation with a multiplicity of openings arranged along a line, which are formed during the building up of the sheet-like part 124, 124', 134, 144 in layers. The openings can be circular, oval or diamond-shaped in cross section, for example, or the openings can have an inner surface which is in each case designed as a segment of a spherical surface.

Figure 19:
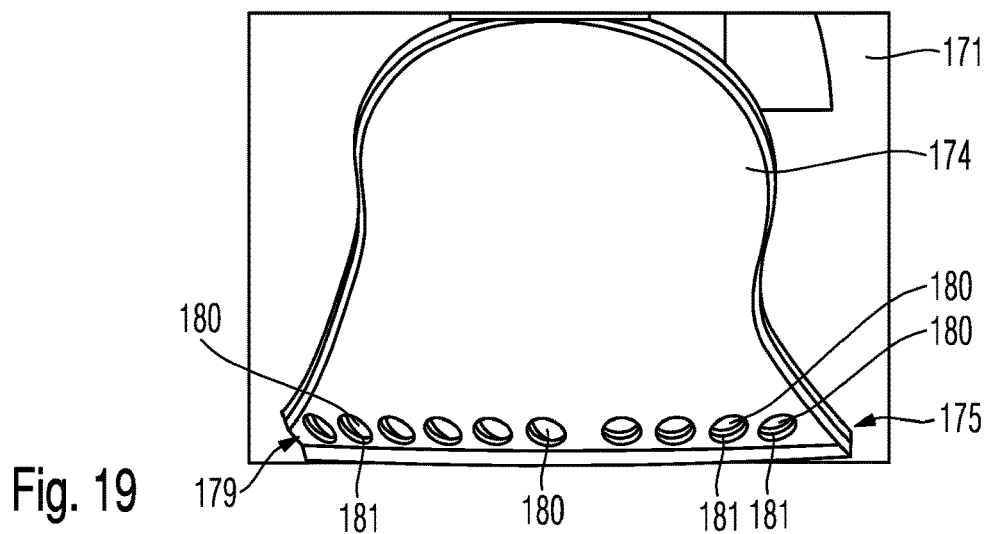
FIG. 19 shows a perspective view of a sheet-like part and of a section of an object, as built up in a method according to a fourteenth illustrative embodiment of the disclosure herein, wherein the sheet-like part has a perforation.
Figure 20:
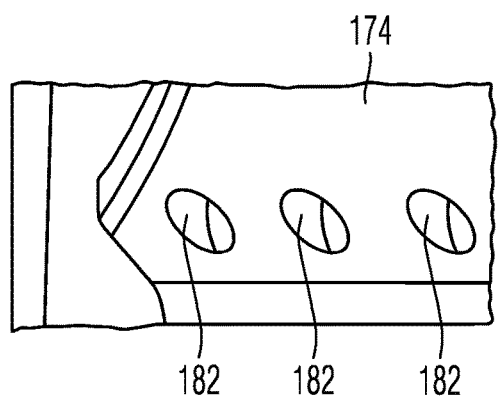
FIG. 20 shows a detail designed to illustrate the perforation shown in FIG. 19.

A preferred variant of the perforation is shown in FIGS. 19 and 20 with reference to a fourteenth illustrative embodiment. FIG. 19 shows a sheet-like part 174 of a supporting structure used in a method for generative production of an object 171. Along a contour of the object 171, the sheet-like part 174 is provided with a perforation 179 in a region 175 in which it is attached to the object 171, wherein the sheet-like part 174 has a multiplicity of openings 180 to form the perforation 179. For the sake of greater clarity, only some of the openings 180 are provided with reference signs.

An inner surface 181 of the openings 180 is in each case formed as a segment of a spherical surface. FIG. 20 shows schematically how—with the aid of design software for example—a spherical element 182 is subtracted in the case of each opening 180 from the basic shape of the sheet-like part 174, which is initially envisioned as continuous.

Figure 21:
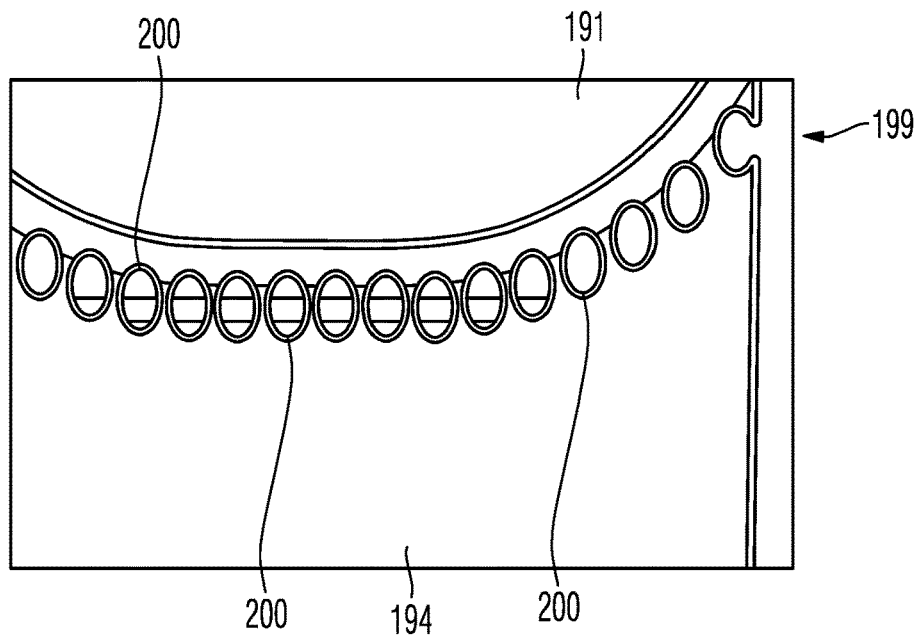
FIG. 21 shows a section of an object as well as of a sheet-like part of a supporting structure, which have been built up in a method according to a fifteenth illustrative embodiment of the disclosure herein, wherein the sheet-like part has a perforation.
Figure 22:
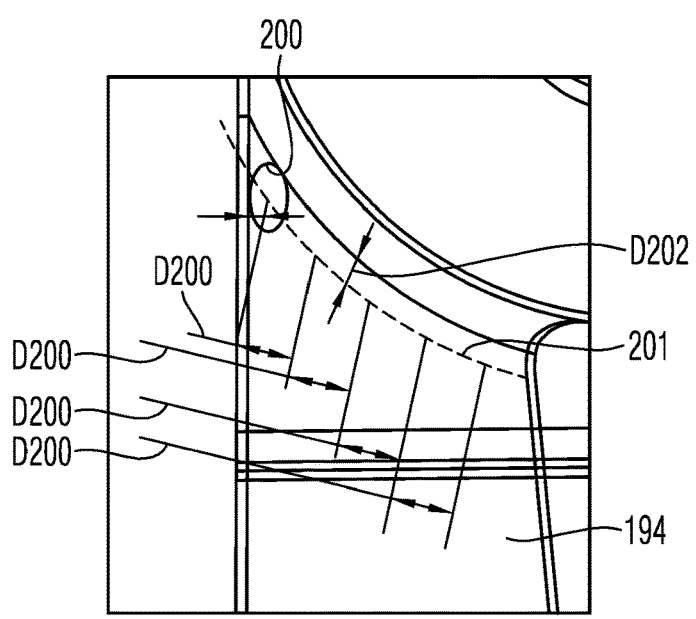
FIG. 22 shows a schematic illustration intended to clarify the positioning of openings of the perforation shown in FIG. 21.
Figure 23:
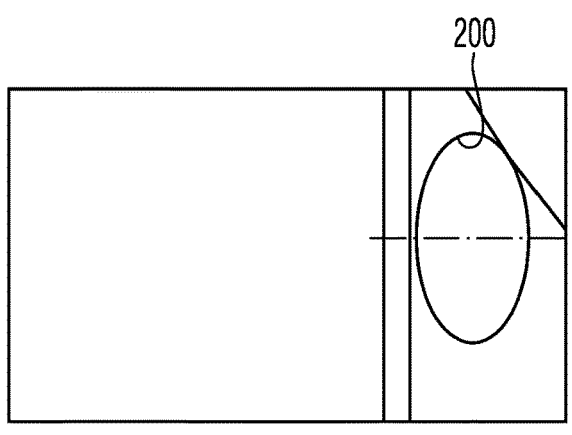
FIG. 23 shows another schematic depiction of the shape of an opening of the perforation in FIG. 21.

Another preferred variant of the perforation is depicted in FIGS. 21 to 23 with reference to a fifteenth illustrative embodiment. In accordance with the fifteenth illustrative embodiment, a sheet-like part 194 of a supporting structure is provided with a perforation 199 along a contour of an object 191 to be produced generatively. The perforation 199 is formed with openings 200 which have an oval cross section. In the case of a sheet-like part 194 arranged obliquely to the buildup direction A, oval openings 200 can advantageously somewhat mitigate abrupt changes in the surface to be irradiated and can thus somewhat mitigate abrupt changes in the heat input. The openings 200 can be elliptical, for example, see FIGS. 22 and 23.

Openings arranged along a line along the contour of the object to form the perforation 129, 129', 139, 149, 179, 199 can be provided at a distance of about 0.1 mm to about 1.5 mm from the contour of the object, wherein the centers of adjacent openings can be arranged at a spacing of about 1.0 mm to about 2.0 mm from one another along the contour of the object. Corresponding center distances D200 of the elliptical openings 200 along a line 201 parallel to the contour of the object 191, where D200 is from about 1.0 mm to about 2.0 mm, are shown diagrammatically by way of example in FIG. 22. A distance between the line 201 and the contour of the object 191 is denoted by D202 and can be from about 0.1 mm to about 1.5 mm.

It should be mentioned that the illustrative embodiments described with reference to FIGS. 19 to 23 also represent variants of the methods of the kind described with reference to FIGS. 13 to 15. Attention is therefore additionally drawn to the above statements relating to FIGS. 13-15.

A perforation 129, 129', 139, 149, 179, 199, as described above with reference to FIGS. 13-15 and 19-23, can furthermore be combined with the predetermined breaking edge 156 in FIGS. 16 to 18. Such a combination is preferred in the case of FIGS. 13, 14 and 15, for example. In this case, the perforation can primarily improve the trickling out of powder in powder bed methods and prevent material accumulations, for example, while the predetermined breaking edge 156 helps to improve removal of the sheet-like part.

The sheet-like parts 124, 124', 134, 144, 154, 174, 194 can each be regarded as supporting plates which carry the supporting substructure (illustrated graphically only in the case of the examples in FIGS. 13 and 14) and enable them to be shortened.

In the case of the illustrative embodiments in FIGS. 13 to 23 too, the in each case additively generated object, e.g. object 121, 131, 141, 171 or 191, together with the respectively built-up supporting structure, is subjected to a heat treatment, in particular to hot isostatic pressing (HIP). In this case, the supporting structure with the respectively provided sheet-like part 124, 124', 134, 144, 154, 174 or 194 aligned obliquely forward in the buildup direction A and the supporting substructure (not shown in all the figures) supported thereby can advantageously additionally be used to counteract deformation of overhanging sections or projecting parts of the object, e.g. due to the intrinsic weight thereof, during hot isostatic pressing.

After heat treatment, the objects obtained according to the illustrative embodiments in FIGS. 13 to 23 can be subjected to finish-machining. In this case, the supporting structure is removed manually even before machining, for example, but it would also be possible instead for it to be removed during machining or only at the end thereof or afterwards.

As an alternative, the supporting structure in the illustrative embodiments in FIGS. 13 to 23 can be removed manually directly after the generative buildup of the object.

Figure 24:
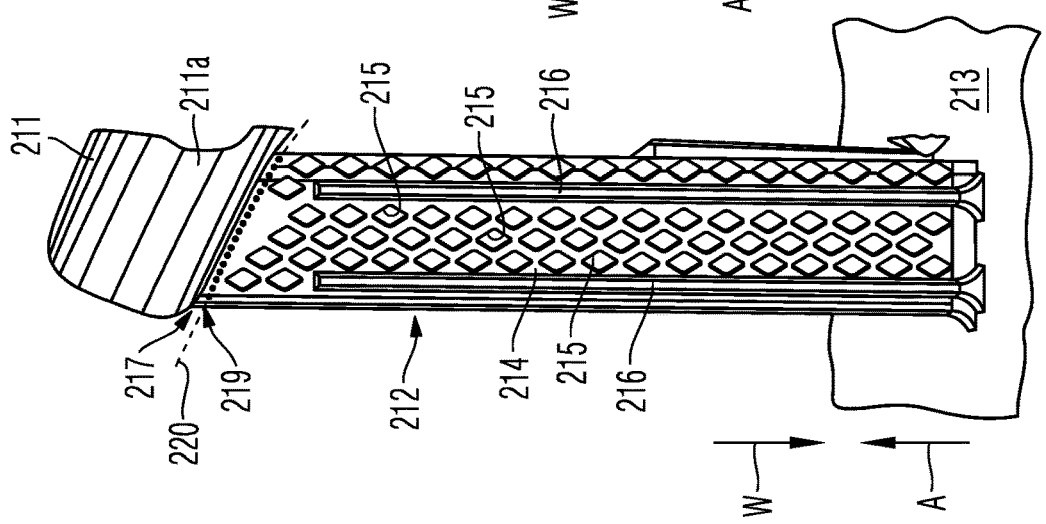
FIG. 24 shows a supporting structure having a sheet-like part as well as a section of an object, which have been built up in a method according to a sixteenth illustrative embodiment of the disclosure herein, in perspective.

A supporting structure 212 which is used in a method for producing an object 211 by generative manufacturing in accordance with a sixteenth illustrative embodiment is shown by FIG. 24. Only a segment of the object 211 is graphically illustrated. The supporting structure 212, which is built up in layers like the object 211, serves to support an overhanging section 211a of the object 211 along a line during the buildup in layers. The supporting structure 212 has a sheet-like part 214, which projects from the base 213 while being upright on the latter and is built up in layers in such a way that it extends along the buildup direction A of the object 211.

In the case of the illustrative embodiment in FIG. 24, the sheet-like part 214 is designed as a supporting plate standing perpendicularly on the base 213 and having a multiplicity of apertures 215. The apertures 215 are of diamond-shaped design, as a result of which the apertures 215 do not themselves have to be supported in turn by virtue of the slope of the inner surfaces thereof with respect to the direction of action W of gravity, which is advantageously not excessive.

In addition, the sheet-like part 214 is provided with ribs 216, which likewise extend away from the base 213 along the buildup direction A. The ribs 216 do not extend over the full height of the sheet-like part 214, see FIG. 24. With the exception of the ribs 216, the sheet-like part 214 is of substantially planar design. The ribs 216 stabilize the relatively thin sheet-like part 214 against unwanted deformation, due, for instance, to a heat input during the buildup in layers.

FIG. 24 furthermore shows that the sheet-like part 214 has been formed with a perforation 219 along a contour of the object 211 in a region 217 in which it is connected linearly to the object 211. The perforation 219 is formed with a multiplicity of openings (not shown specifically in FIG. 24), which, as described with reference to the illustrative embodiments in FIGS. 13-15 and 19-23, can be of circular, oval, elliptical or diamond-shaped design or can be designed with a spherical inner surface. In FIG. 24, the openings of the perforation 219 are considerably smaller than the apertures 215. In the illustrative embodiment in FIG. 24, the openings of the perforation 219, which are arranged along a line 220, serve to enable the sheet-like part 214 to be separated more easily from the object 211 when the supporting structure 212 is no longer required. As regards possible spacings of the openings of the perforation 219 from one another and from a contour of the object 211, attention is drawn to the above statements, in particular with reference to FIG. 22.

Figure 25:
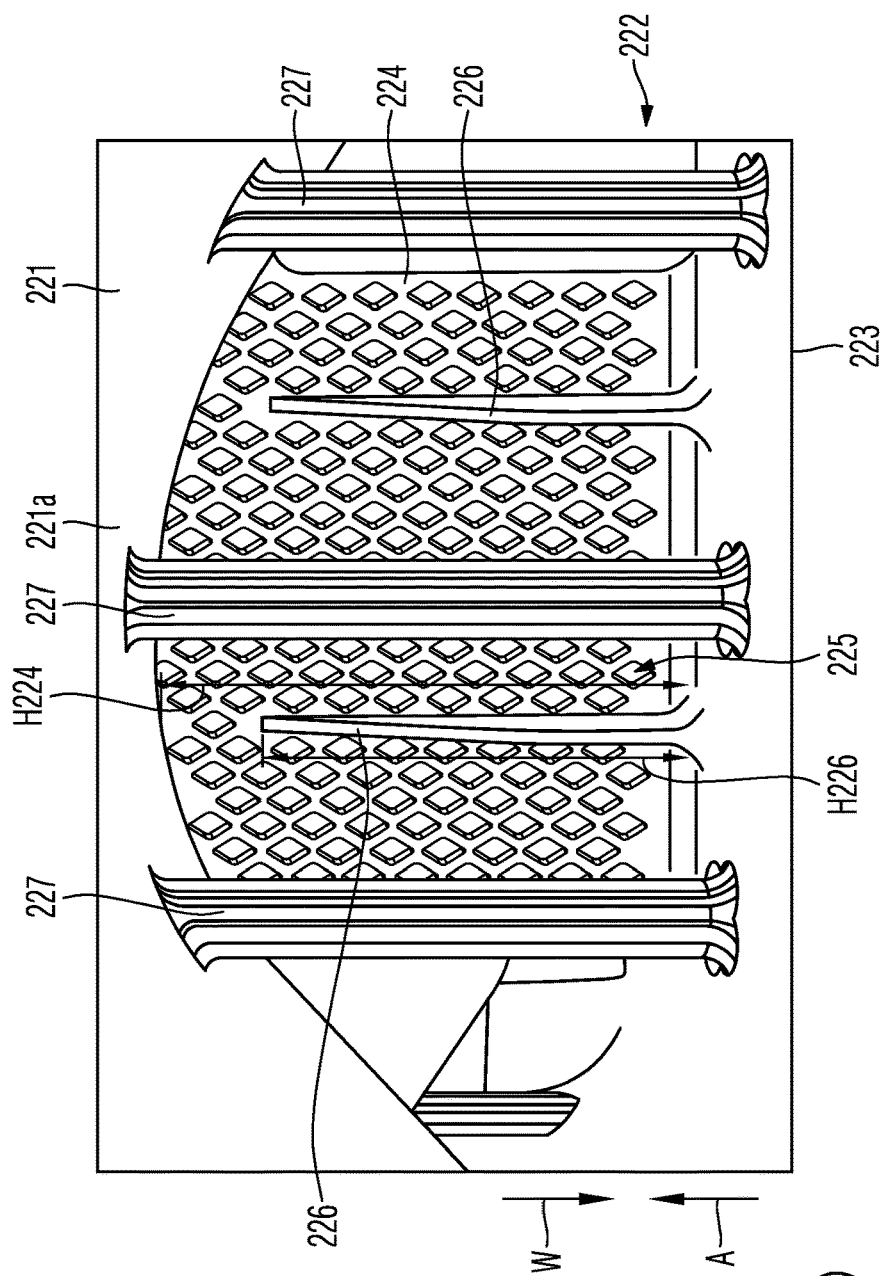
FIG. 25 shows a supporting structure having a sheet-like part and struts, and a section of an object, which have been built up in a method according to a seventeenth illustrative embodiment of the disclosure herein, in perspective.

A supporting structure 222 which is used in a method for producing an object 221 by generative manufacturing in accordance with a seventeenth illustrative embodiment is depicted in FIG. 25. An overhanging section 221a of the object 221 is supported against a base 223 by the supporting structure 222. The supporting structure 222 has a sheet-like part 224, which is connected to the object 221 and, as in the sixteenth illustrative embodiment, is designed as a supporting plate standing vertically on the base 223 or supporting platform along the buildup direction A and having a multiplicity of diamond-shaped apertures 225 and offers linear support. The sheet-like part 224 too is reinforced against deformation by ribs 226, which extend substantially along the buildup direction A. By way of example, a height H226 of the ribs 226 along the buildup direction A can be between about 80 percent and about 90 percent of the height H224 of the sheet-like parts 224 at this point. The same applies to the height of the ribs 216 in relation to the sheet-like part 214 in FIG. 24.

In accordance with the seventeenth illustrative embodiment, further support of the section 221a is provided by a plurality of struts 227 extending along the buildup direction A, which each have a cross-sectional shape resembling a four-leaf clover, as described in detail above with reference to FIG. 12. As regards the struts 227, attention is drawn to the above statements.

In the illustrative embodiments in FIGS. 24 and 25 too, the respectively additively generated object 211, 221, together with the respective supporting structure 212 or 222, can be subjected to a heat treatment, in particular to hot isostatic pressing (HIP). During this process, the supporting structures 212, 222 can once again counteract deformation of the object during hot isostatic pressing.

Moreover, the objects 211, 221 obtained can likewise be subjected, after such a heat treatment, to machining, wherein the supporting structure 212, 222 can be removed even before machining, during machining or only at the end of or after machining. Particularly in the case of FIG. 24, the perforation 219 makes it possible to remove the sheet-like part 214 in a simple way, e.g. manually.

In all the illustrative embodiments described above, a powder bed method, in which a starting material is applied in layers as a powder and is locally irradiated, e.g. by a laser beam, and thereby sintered or melted, is used for generative manufacture both of the object, in particular of object 1, 11, 21, 41, 61, 81, 91, 101, 111, 121, 131, 141, 171, 191, 211, 221 and of the respective supporting structure, in particular supporting structure 2, 12, 22, 42, 62, 82, 92, 102, 112, 122, 132, 212, 222. Selective laser sintering, selective laser melting or electron beam melting may be considered, in particular. In the illustrative embodiments, generative manufacture by rapid plasma depositing may furthermore be considered, for example.

In the illustrative embodiments described above, the buildup direction A is aligned parallel to the vertical and thus parallel to and opposite to a direction of action W of gravity.

In all the illustrative embodiments described above, the object and the supporting structure are furthermore generated additively from a metal material, e.g. from aluminum, an aluminum alloy, titanium, a titanium alloy, a steel, such as, in particular, a nickel-based steel, or a nickel base alloy, for applications at high temperatures, for example. The sheet-like parts 4, 124, 124', 134, 144, 154, 174, 194, 214, 224, the ribs 216, 226, the arch or arches 15, 25, 27, 29, 45, 49, the arch sections 35, 36, the struts 64, 84, 94, 104, 114, 227 and the supporting substructure 18, 38, 48, 128, 128', 138, where present, are each built up in layers from the same starting material as the object. In the illustrative embodiments described, the base on which the buildup in layers takes place, e.g. the base 3, 13, 23, 63, 83, 93, 103, 113, 213, 223, is designed as a metal plate, made from titanium for example, and can also be referred to as a supporting platform or base plate.

It should be noted that, in the illustrative embodiments described above, the sheet-like part, the ribs, the arch or the arches, the arch sections and the strut or struts, where present, can furthermore be built up in layers with the aid of a device for generative manufacture by the same processing parameters as for the actual object to be generated. In contrast, processing parameters for the delicate and fragile supporting substructure 18, 38, 48, 128, 128', 138 of a different character which is used in some of the illustrative embodiments can differ from the processing parameters for the buildup of the object. In this way, the supporting substructure can be made fragile and built up more quickly than the object with the aid of different processing parameters.

By the methods explained above with reference to illustrative embodiments, it is possible, in particular, to produce component parts for aircraft or spacecraft. The additively generated objects can form semifinished products for the production of the component parts, wherein, in particular, the component part can be produced from the semifinished product by way of intermediate steps of a hot isostatic pressing operation and machining. With regard to such component parts, which are often complex in shape, the methods described above are particularly suitable for improving the dimensional accuracy and quality thereof and for reducing production costs.

It is possible, in particular, for the methods according to the illustrative embodiments explained above to be carried out in such a way that computer-readable instructions stored on a computer-readable medium are carried out on a data processing device, wherein these instructions cause a device or arrangement for generative manufacture to carry out the method according to one of the illustrative embodiments above. Here, the data processing device can form a part of the device or arrangement for generative manufacture or can communicate therewith.

In the above detailed description, various features have been combined in one or more examples for the sake of improving the cogency of the depiction. However, it should be clear here that the above description is only of an illustrative and in no way restrictive nature. It serves to cover all alternatives, modifications and equivalents of the various features and illustrative embodiments. Many other examples will be immediately and directly clear to a person skilled in the art in light of the above description, based on their specialist knowledge.

The illustrative embodiments have been selected and described to enable the principles underlying the disclosure herein and the possible applications thereof in practice to be illustrated as well as possible. This will enable experts to modify and apply the disclosure herein and its various illustrative embodiments in the optimum way in relation to the intended use. In the claims and the description, the terms "containing" and "having" are used as linguistically neutral concepts for the corresponding term "comprising". Furthermore, any use of the terms "a" and "an" is not intended in principle to exclude a plurality of features and parts described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 object
2 supporting structure
3 base
4 sheet-like part
5 bulge
6a,b corrugated shape
7 foot
8 bulge tip
11 object
11a overhanging section
12 supporting structure
12a first region (supporting structure)
12b second region (supporting structure)
13 base
14 arch structure
15 arch
16a,b arch segment
17 tip
17a-c rounded portion
18 supporting substructure
21 object
21a overhanging section
22 supporting structure
22a first region (supporting structure)
22b second region (supporting structure)
23 base
24 arch structure
25 arch
25a foot region
26a,b arch segment
26c tip
27 arch
28a,b arch segment
28c tip
29 arch
30a,b arch segment
30c tip
33 first tier
34 second tier
35 arch section
36 arch section
38 supporting substructure
41 object
41a overhanging section
42 supporting structure
42a first region
42b second region
44 arch structure
45 arch
46a,b arch segment
46c tip
47 third tier
48 supporting substructure
49 arch
50a,b arch segment
50c tip
61 object
61a section
62 supporting structure
63 base
64 strut
65 cross-sectional shape 66a-d leaf-type subregion (cross-sectional shape)
67 center (cross-sectional shape)
68a-d end (of leaf-type subregion)
69a-d semicircular shape
70ab quadrant shape
70bc quadrant shape
70cd quadrant shape
70da quadrant shape
71a-d circle center
81 object
81a,b section
82 supporting structure
83 base
84 strut
91 object
91a section
92 supporting structure
93 base
94 strut
94a upper region
101 object
101a section
101b flange
102 supporting structure
103 base
104 strut
111 object
111a,b section
112 supporting structure
113 base
114 strut
121 object
121a section
122 supporting structure
122' further supporting structure
124 sheet-like part
124' sheet-like part
125 region
125' region
128 supporting substructure
128' supporting substructure
129 perforation
129' perforation
131 object
131a section
132 supporting structure
134 sheet-like part
134a outer edge
135 region
138 supporting substructure
139 perforation
141 object
144 sheet-like part
144a outer edge
144b subregion
144c subregion
149 perforation
154 sheet-like part
155 region
156 predetermined breaking edge
157 surface
160 reduced cross section
162 reentrant portion
171 object
174 sheet-like part
175 region
179 perforation
180 opening
181 inner surface
182 spherical element
191 object
194 sheet-like part
199 perforation
200 opening
201 line
211 object
211a overhanging section
212 supporting structure
213 base
214 sheet-like part
215 aperture
216 rib
217 region
219 perforation
220 line
221 object
221a overhanging section
222 supporting structure
223 base
224 sheet-like part
227 strut
A buildup direction
D69 spacing
D200 spacing
D202 spacing
H main surface of extent
H224 height
H226 height
M15 center line
P arrow
R1 direction
R2 direction
R16 radius (circular arc segment)
R26' radius (circular arc segment)
R26" radius (circular arc segment)
R69 first radius
R70 second radius
R161 radius
R162 radius
t wall thickness
U circumferential direction
W direction of action of gravity
ϑ angle
ϑ' angle

The invention claimed is:
1. A method for producing an object by generative manufacturing by building up the object in layers, the method comprising:
    building up a plurality of layers to form a supporting structure that supports at least one overhanging section, to be generated, of the object by the supporting structure;
    wherein the plurality of layers comprises a first layer, a second layer, and a third layer;
    wherein the first layer comprises a plurality of arches built up on a base;
    wherein the second layer comprises a plurality of arches that are built up on top of the plurality of arches of the first layer;
    wherein the third layer comprises at least one arch that is built up between the at least two arches of the second layer; and
    wherein each arch of the plurality of arches of all of the first layer, the second layer, and the third layer is formed by arch segments which converge substantially in a buildup direction of the object and meet at a tip of the arch;

wherein the plurality of arches of the second layer comprise at least two arches that have different heights from each other;

wherein the at least two arches of the second layer are each connected to and extend away from, in the buildup direction, a corresponding tip of the plurality of arches of the first layer; and wherein the at least one arch of the third layer is built up on mutually facing arch segments of the at least two arches of the second layer.

2. The method of claim 1, wherein the plurality of arches of the first layer are built up directly on the base.

3. The method according to claim 1, wherein:

an arch structure having the at least one arch is formed in a first region of the supporting structure; and a supporting substructure that is different from the at least one arch is formed in a second region of the supporting structure, wherein the arch structure and the supporting substructure are formed such that the arch structure supports the supporting substructure, and wherein the overhanging section is supported over an extended area against the arch structure by the supporting substructure during buildup of the overhanging section of the object.

4. The method according to claim 3, wherein the supporting substructure is a delicate and/or fragile supporting substructure.

* * * * *